US012443144B2

(12) United States Patent
Fiammingo

(10) Patent No.: US 12,443,144 B2
(45) Date of Patent: Oct. 14, 2025

(54) HOROLOGY DIAL FOOT, HOROLOGY DIAL PLATE AND HOROLOGY DIAL

(71) Applicant: ROLEX SA, Geneva (CH)

(72) Inventor: Daniel Fiammingo, Sciez (FR)

(73) Assignee: ROLEX SA, Geneva (CH)

( * ) Notice: Subject to any disclaimer, the term of this patent is extended or adjusted under 35 U.S.C. 154(b) by 546 days.

(21) Appl. No.: 17/729,559

(22) Filed: Apr. 26, 2022

(65) Prior Publication Data

US 2022/0350293 A1 Nov. 3, 2022

(30) Foreign Application Priority Data

Apr. 29, 2021 (EP) .................................... 21171252

(51) Int. Cl.
*G04B 19/14* (2006.01)
*G04B 19/12* (2006.01)
*G04B 45/00* (2006.01)

(52) U.S. Cl.
CPC ............ *G04B 19/14* (2013.01); *G04B 19/12* (2013.01); *G04B 45/0015* (2013.01)

(58) Field of Classification Search
CPC ..... G04B 19/14; G04B 19/12; G04B 45/0015
See application file for complete search history.

(56) References Cited

U.S. PATENT DOCUMENTS

| | | | | |
|---|---|---|---|---|
| 780,775 A | | 1/1905 | Bookwalter | |
| 4,291,401 A | * | 9/1981 | Bachmann | G04B 19/14 968/157 |
| 5,699,324 A | * | 12/1997 | Perrot | G04B 19/14 368/294 |
| 2013/0148484 A1 | * | 6/2013 | Jeanrenaud | G04B 19/12 368/232 |
| 2017/0176944 A1 | | 6/2017 | Vuille | |
| 2019/0143416 A1 | * | 5/2019 | Luebbe | B28B 11/0845 428/472.1 |
| 2019/0163138 A1 | | 5/2019 | Erard | |
| 2019/0391533 A1 | * | 12/2019 | Barfuss | G04D 3/0002 |
| 2020/0080580 A1 | | 3/2020 | Clavelle et al. | |
| 2020/0301363 A1 | | 9/2020 | Fiammingo et al. | |
| 2021/0173343 A1 | * | 6/2021 | Lauper | G04B 19/12 |

FOREIGN PATENT DOCUMENTS

| | | |
|---|---|---|
| EP | 2952974 A1 | 12/2015 |
| EP | 3185086 A1 | 6/2017 |
| EP | 2952974 B1 | 7/2017 |
| EP | 3489764 A1 | 5/2019 |
| EP | 3712713 A1 | 9/2020 |
| FR | 1021251 A1 | 2/1953 |

OTHER PUBLICATIONS

European Search Report and Written Opinion dated Sep. 22, 2021 in priority application No. EP21171252; with English machine translation (total 14 pages).

* cited by examiner

*Primary Examiner* — Edwin A. Leon
*Assistant Examiner* — Sean R Brannon
(74) *Attorney, Agent, or Firm* — Seckel IP, PLLC

(57) ABSTRACT

A foot (2) for a timepiece dials includes a plastically deformable element (23) arranged so as to connect the foot (2) to a dial plate by cooperation, in particular by obstacle cooperation, of the plastically deformable element (23) in the deformed configuration with a shaped portion (15) of a dial plate.

24 Claims, 15 Drawing Sheets

HOROLOGY DIAL FOOT, HOROLOGY DIAL PLATE AND HOROLOGY DIAL

This application claims priority of European patent application No. EP21171252.6 filed Apr. 29, 2021, the content of which is hereby incorporated by reference herein in its entirety.

BACKGROUND ART

The invention relates to a horology dial foot. The invention also relates to a horology dial plate. The invention further relates to a horology dial comprising such a foot and/or such a plate. The invention likewise relates to a timepiece comprising such a horology dial or such a foot or such a plate. The invention finally relates to a method for mounting such a dial or such a timepiece.

Horology dials generally comprise feet. The latter are conventionally attached to a lower surface of the dial, generally by welding or brazing, and are provided to be accommodated in bores formed on an upper surface of the timepiece's movement frame.

The dial must thus be made of a material capable of withstanding such an assembly method, or comprise a lower dial plate which comprises feet or is capable of withstanding such an assembly method. In the case of stone dials, a lower dial plate may then be attached to the dial, in particular by adhesive bonding, in particular by way of an adhesive strip. Irrespective of the thickness of such a dial, such a solution assembly is not without its drawbacks, in particular regarding the repeatability thereof, in particular with regard to metering the adhesive and the changes it undergoes over time.

Patent application EP3489764 discloses a dial formed of a first plate made of a brittle material, which is adhesively bonded to a second plate made from a metallic material such as brass. It is in particular specified that these plates may be connected by way of an adhesive tape. In addition to the drawbacks inherent in using an adhesive, such a design is not optimal insofar as it entails a dial having a thickness which is dictated by the assembly of two superposed plates.

Document FR1021251 discloses a dial comprising two mobile feet. Each of the feet has the peculiarity of comprising a split head shaped to be accommodated respectively within first and second grooves formed in dial plate. Each groove comprises a dovetail portion which is capable of receiving a foot head and so axially locking said foot in relation to the dial plate. On mounting, the foot head is elastically deformed within the groove, which allows said foot to be held in position in the plane of the dial solely by a frictional effect, without other locking means. The foot can therefore be displaced unintentionally, which is undesirable.

Application EP2952974 discloses a method for assembling a foot on a dial plate, which in particular involves a step of crimping said foot within a groove formed on the dial plate. More particularly, the groove comprises a shoulder intended to cooperate at least in part with a head of the foot, in order to enable axial retention of the foot in relation to the dial plate. This shoulder furthermore comprises a plastic deformation zone intended to be deformed against the head of the foot, in order to allow the foot to be translationally locked within the groove, so fixing the foot to the dial plate. Such an assembly solution requires a dial plate made of a material comprising a plastic deformation zone and is therefore not suitable for assembling a foot on a dial plate made of stone or ceramic.

Application US2020080580 relates to a device for assembling a first component on a second component manufactured from a brittle material, in particular from a ceramic such as a zirconia or alumina. This device is composed of a screw foot provided with a portion comprising a non-circular portion, which is intended to be accommodated in the interior of a groove disposed at the level of an opening formed within the second component manufactured from a brittle material. The screw foot is thus retained axially within the second component by way of a shoulder formed by the groove. Fixation of the screw foot within the second component is effective on fixation of the first component to the second component by way of a screw screwed into the screw foot itself. Such a solution for assembling a screw foot within a component manufactured from a brittle material is therefore not sufficient in itself, and is thus not suitable for assembling a foot on a horology dial plate.

SUMMARY OF THE INVENTION

The object of the invention is to provide a horology dial foot which improves upon feet known in the prior art. In particular, the invention proposes a foot of simple construction which enables easy and reliable fixation to a dial plate made of a brittle material.

A first aspect of the invention provides a dial foot as defined by point 1 below.

1. A foot for a timepiece dial comprising a plastically deformable element arranged so as to connect the foot to a dial plate by cooperation, in particular by obstacle cooperation, of the plastically deformable element in the deformed configuration with a shaped portion of a dial plate.

Points 2 to 7 below define embodiments of the foot.

2. The foot as defined in point 1, wherein the plastically deformable element is arranged so as to lock the foot in a plane parallel to a dial plate, in particular arranged so as to lock the foot rotationally about an axis perpendicular to a plane parallel to a dial plate.
3. The foot as defined in one of the preceding points, wherein it comprises a head comprising at least one cylindrical portion and/or comprising the plastically deformable element.
4. The foot as defined in one of the preceding points, wherein the head comprises flats or wings.
5. The foot as defined in one of the preceding points, wherein it comprises a first positioning element of the foot relative to a dial plate, in particular arranged so as to position the foot relative to a dial plate in a plane parallel to a dial plate, the first positioning element comprising for example a cylindrical portion for positioning and/or rotational guidance of the foot about an axis perpendicular to a plane parallel to a dial plate and/or the first positioning element being for example part of the head.
6. The foot as defined in one of the preceding points, wherein the foot, in particular the head, comprises an element, in particular a foot print, for driving the foot relative to a dial plate.
7. The foot as defined in one of the preceding points, wherein the plastically deformable element is a plastically deformable lip or wall.

According to the first aspect, point 8 below defines a dial plate.

8. A dial plate for a timepiece dial comprising a shaped portion arranged so as to connect a foot to the dial plate by cooperation, in particular by obstacle cooperation, of the shaped portion with a plastically deformable element of a foot.

Points 9 to 11 below define embodiments of the plate.

9. The dial plate as defined in the preceding point, wherein:
   - it comprises a second positioning element of a foot relative to the dial plate, in particular comprising a bore and/or arranged so as to position a foot relative to the dial plate in a plane parallel to the dial plate, and/or
   - the shaped portion is arranged so as to lock the foot in a plane parallel to the dial plate, in particular arranged so as to lock the foot rotationally about an axis perpendicular to a plane parallel to a dial plate.
10. The dial plate as defined in point 8 or 9, wherein it comprises a receiving opening, in particular a receiving groove or a counterbore, intended to receive a head of a foot.
11. The dial plate as defined in one of points 8 to 10, wherein the shaped portion is a notch.

According to the first aspect, point 12 or point 15 below defines a dial.

12. A dial for a timepiece comprising at least one foot, preferably two feet, as defined in one of points 1 to 7 and/or a dial plate as defined in one of points 8 to 11.
15. A dial obtained by carrying out the method as defined in point 14.

According to the first aspect, point 13 below defines a timepiece.

13. A timepiece comprising the foot as defined in one of points 1 to 7 and/or the dial plate as defined in one of points 8 to 11 and/or the dial as defined in the preceding point.

According to the first aspect, point 14 below defines a method for mounting a dial.

14. A method for mounting a dial for a timepiece or a timepiece comprising the following steps:
   - providing a foot, in particular a foot as defined in one of points 1 to 7,
   - providing a dial plate, in particular a plate as defined in one of points 8 to 11,
   - positioning the foot relative to the dial plate, in particular along a plane parallel to the dial plate,
   - plastically deforming a plastically deformable element so as to connect the foot to the dial plate by cooperation of the plastically deformable element in the deformed configuration with a shaped portion of the dial plate, in particular so as to lock the foot rotationally relative to the dial plate about an axis perpendicular to a plane parallel to the dial plate.

The appended drawings represent, by way of example, two embodiments of a timepiece.

DETAILED DESCRIPTION OF PARTICULAR EMBODIMENTS

Figure 1:
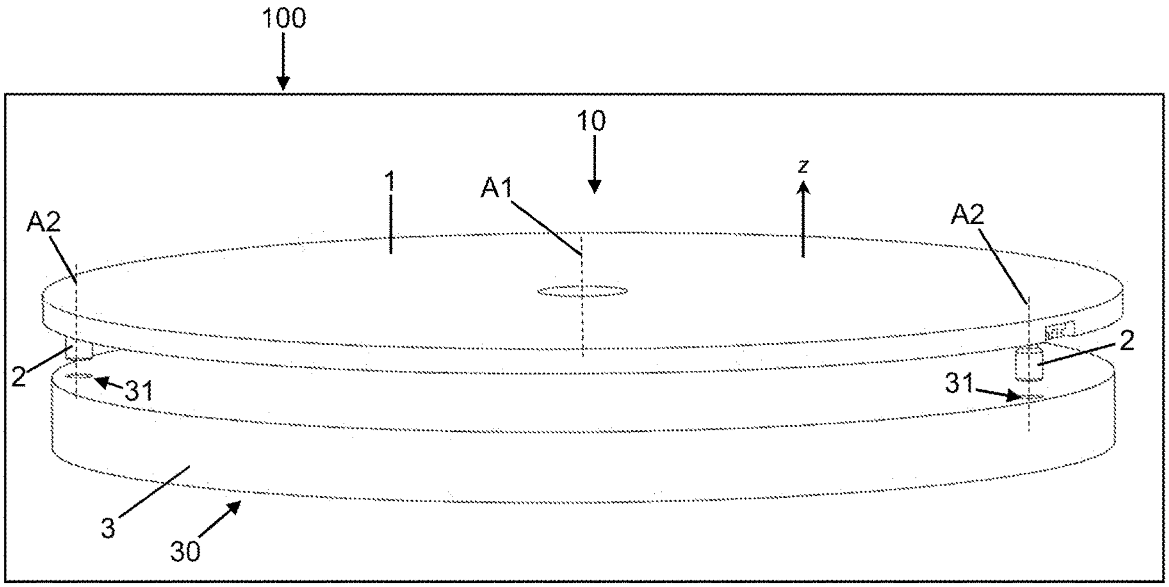
FIG. 1 is a schematic exploded perspective view of a first embodiment of a timepiece.

Embodiments and variants of a timepiece 100; 100'; 100"; 100* are described hereafter with reference to FIGS. 1 to 32.

Regardless of the embodiment or variant, the timepiece 100; 100'; 100"; 100* is for example a watch, in particular a wristwatch. The timepiece 100; 100'; 100"; 100* comprises a horology movement 30 and a dial 10; 10'; 10"; 10* intended to be mounted in a timepiece casing or case to protect it from the outside environment. The horology movement may be an electronic movement or a mechanical movement, in particular an automatic movement, or indeed a hybrid movement.

Whatever the embodiment or variant, the dial 10; 10'; 10"; 10* comprises at least one foot 2; 2'; 2"; 2* shaped to be mechanically connected to a dial plate 1; 1'; 1"; 1*. Advantageously, this foot takes the form of a foot for fixing said dial to a blank 3 of the horology movement 30. Preferably, the dial plate 1; 1'; 1"; 1* comprises the visible surface 11; 11'; 11"; 11* of the dial, i.e. the surface which will possibly bear indices and/or a limb and that the wearer of the timepiece will see, in particular through a glass, when they wish to read time or time-derived information indicated by the timepiece. The dial 10; 10'; 10"; 10* thus advantageously consists of an assembly of one or more feet 2; 2'; 2"; 2* and one and the same dial plate 1; 1'; 1"; 1*. The foot or feet 2; 2'; 2"; 2* is/are thus connected or fixed to one and the same plate 1; 1'; 1"; 1*. "Connected" or "fixed" is here taken to mean any mechanical link implemented without an adhesive bonding, welding or indeed brazing step, which may prove tedious and difficult to repeat. "Fixing" is taken to mean an action which permits immobilization or locking of all degrees of freedom. "Connecting" is taken to mean an action which permits immobilization or locking of only certain degrees of freedom.

By convention, a horizontal plane P is defined as being a plane parallel to the dial plate, and a vertical direction z is defined as the direction which is perpendicular to the horizontal plane P and oriented from the blank 3 toward the dial plate 1; 1'; 1"; 1*, i.e. oriented outward from the plate at the level of the visible surface 11; 11'; 11"; 11*. In the case of a non-planar dial plate, a horizontal plane P may be defined as being a plane comprising the perimeter or periphery of the dial plate or passing as fully as possible through this perimeter or periphery. Using this convention, the foot 2; 2'; 2"; 2* therefore extends vertically downward from the dial plate, and the dial 10; 10'; 10"; 10* is fixed to the blank 3 by the foot 2; 2'; 2"; 2* being brought vertically closer to the movement-blank 3, in particular within a bore 31 in the blank 3. In particular, the foot 2; 2'; 2"; 2* can be fixed within the bore 31 by way of associated fixing means which will not be described in detail in the present description.

Such a dial design is particularly advantageous for enabling assembly of a dial plate made of a brittle material, i.e. which has no or a limited range of plastic deformation. The material of the plate may be based on a ceramic, in particular a zirconia or alumina, a fluorescent and/or phosphorescent ceramic, or a composite ceramic based on yttriated zirconia and Dy/Eu-doped strontium aluminate. The plate may in particular advantageously be made of "luminescent zirconia", for example as described in patent application EP2730636. Alternatively, the plate can be based on a composite material. Further alternatively, it can be based on a mineral material or a material of mineral origin, such as a stone such as onyx, opal, turquoise or sapphire, or based on mother-of-pearl, or based on meteorite. The Vickers hardness of the dial plate is preferably greater than 600 HV, or even greater than 700 HV, or even greater than 800 HV.

In the illustrated embodiments and variants, the dial plate is a circular component with axis A1; A1'; A1"; A1*. Alternatively, the dial plate could be of another shape, for example polygonal, square, or rectangular. In the illustrated embodiments and variants, the dial plate is a planar component. Alternatively, the plate may be non-planar, for example concave or convex. The dial may comprise one or more levels.

In the embodiments and variants illustrated, the feet are preferably made of metal or metal alloy. They may be made of brass. Alternatively, they may be made of steel, in particular of Nivaflex®. Preferably, the Vickers hardness of the feet is less than 600 HV.

Whatever the embodiment or variant, the feet 2; 2'; 2"; 2* take, for example, the form of a component with axis A2; A2'; A2"; A2*, in particular the form of a component comprising a first portion of revolution with axis A2; A2'; A2"; A2*. Once the foot is assembled on the dial plate, the axis A2; A2'; A2"; A2* may in particular be parallel or substantially parallel to the axis A1; A1'; A1"; A1*. The first portions of the feet may in particular be cylindrical or substantially cylindrical and arranged to be accommodated in bores provided in the blank 3 of the horology movement 30. The first portions may also have flats.

A first embodiment of a timepiece 100; 100'; 100" is described hereafter with reference to FIGS. 1 to 24.

The first embodiment of a timepiece 100; 100'; 100" is described hereafter by way of four distinct variants.

As previously seen, the dial may comprise one or more feet. For simplicity's sake, just one foot is described hereafter, it being possible for the dial to comprise one or more identical or similar feet. Whatever the variant embodiment, the dial preferably comprises two feet.

The foot 2; 2'; 2" comprises a plastically deformable element 23; 23'; 23" arranged so as to connect the foot 2; 2'; 2" to the dial plate 1; 1'; 1" by cooperation, in particular by obstacle cooperation, of the plastically deformable element 23; 23'; 23" in the deformed configuration with a shaped portion 15; 15'; 15" of the dial plate 1; 1'; 1".

The dial plate 1; 1'; 1" thus comprises the shaped portion 15; 15'; 15" arranged so as to connect the foot 2; 2'; 2" to the dial plate 1; 1'; 1" by cooperation of said shaped portion 15; 15'; 15" with the plastically deformable element 23; 23'; 23" of the foot 2; 2'; 2".

In this first embodiment, the foot 2; 2'; 2" therefore comprises at least one shaped portion 23; 23' or a zone 23"

capable of plastic deformation against the dial plate. Advantageously, cooperation of the plastically deformable element 23; 23'; 23" and the dial plate 1; 1'; 1", in particular a shaped portion 15; 15'; 15" of the plate, makes it possible to connect, or even fix, the foot to the plate. This connection may be such that slight play remains between the foot and the plate, in particular slight play about the axis A2; A2'; A2" and/or slight play along one or more directions parallel to the axis A2; A2'; A2". The shaped portion 15; 15'; 15" is preferably concave or recessed, such as a notch.

Preferably, the foot 2; 2'; 2" comprises a first positioning element 26; 26'; 26" of the foot relative to the dial plate 1; 1'; 1", in particular arranged so as to position the foot 2; 2'; 2" relative to the dial plate 1; 1'; 1" in the plane P. In order to do this, the plate comprises a second positioning element 18; 18'; 18" of the foot 2; 2'; 2" relative to the plate 1; 1'; 1". This second element may comprise a bore 18; 18'; 18" and/or be arranged so as to position the foot 2; 2'; 2" relative to the plate in the plane P. Thus, the first and second positioning elements cooperate to position the foot in relation to the plate in the plane P.

Still more preferably, the plastically deformable element 23; 23'; 23" is arranged so as to lock the foot 2; 2'; 2" in the plane P, in particular arranged so as to lock the foot 2; 2'; 2" rotationally about the axis A2; A2'; A2". Similarly, the shaped portion 15; 15'; 15" is arranged so as to lock the foot 2; 2'; 2" in the plane P, in particular arranged so as to lock the foot 2; 2'; 2" rotationally about the axis A2; A2'; A2". Locking is advantageously effected by cooperation of the plastically deformable element 23; 23'; 23" (in the deformed configuration) and the shaped portion 15; 15'; 15".

Preferably, the foot 2; 2'; 2" comprises a head 22; 22'; 22" comprising at least one second cylindrical portion and/or the plastically deformable element 23; 23'; 23".

Advantageously, the first positioning element 26; 26'; 26" comprises a cylindrical portion 26; 26'; 26" for positioning and/or rotational guidance of the foot about the axis A2; A2'; A2" and/or the first positioning element 26; 26'; 26" is part of the head 22; 22'; 22".

Still more advantageously, the foot, in particular the head 22; 22'; 22", comprises an element 27; 27'; 27", in particular a foot print, for driving the foot relative to the plate. This foot print is advantageously arranged to receive a tool end which allows the foot to be displaced relative to the plate, in particular to be displaced rotationally about the axis A2; A2'; A2".

Preferably, the plate comprises a receiving opening 13; 13'; 13", in particular a receiving groove 13; 13" or a counterbore 13' or a blind hole 13', intended to receive the head 22; 22'; 22" of the foot 2; 2'; 2".

A first variant of the first embodiment is described hereafter with reference to FIGS. 1 to 11.

Figure 2:
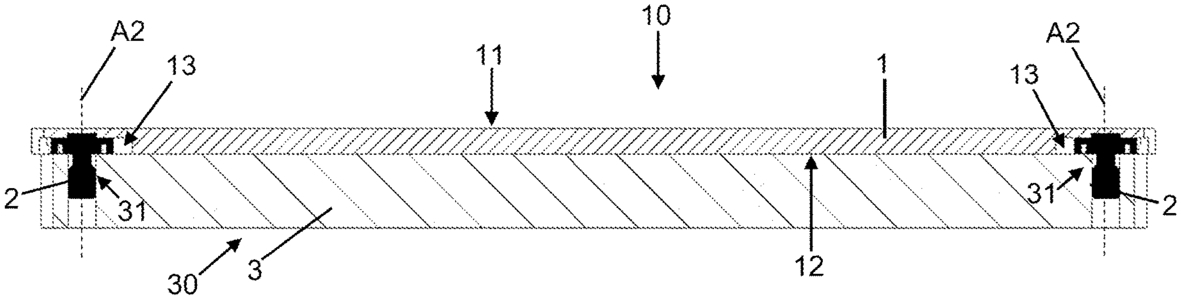
FIG. 2 is an axial cross-sectional view of a dial of the first embodiment of the timepiece.

FIG. 1 is an exploded perspective view of the dial 10 and the blank 3 of the horology movement 30 and FIG. 2 is a cross-sectional view of the dial 10 passing through the respective axes A2 of two feet 2 assembled on the plate 1.

More particularly, the feet 2 are respectively accommodated in receiving openings 13 formed on a lower face 12 of the dial plate 1, opposed to the upper face 11 of this same plate 1 which constitutes the visible face 11 of the dial 10.

Figure 3:
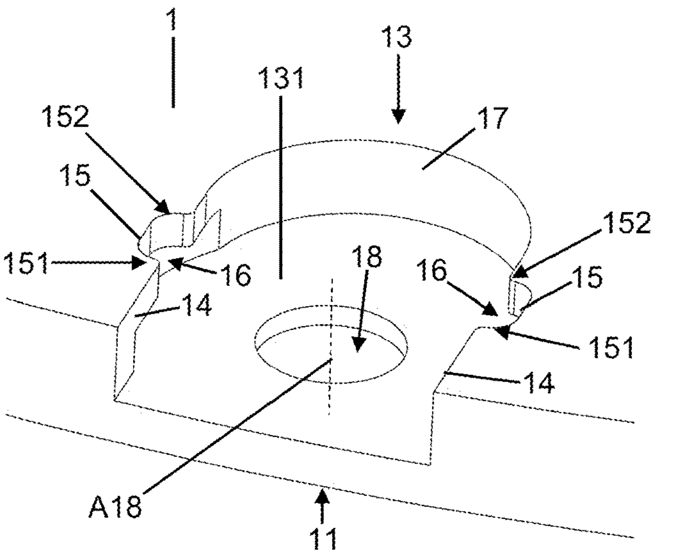
FIG. 3 is a detail partial perspective view of a dial plate of a first variant of the first embodiment of the timepiece.

FIG. 3 illustrates a receiving opening 13 made in the plate. This opening 13 is a groove provided with two parallel walls 14 connected by a rounded contour 17, which defines a receiving surface 131 for the head 22 of the foot 2. This surface 131 is preferably parallel to the lower face 12 and/or to the upper face 11. The walls 14 have the peculiarity of each comprising a notch 15 under which is provided a housing 16 which is intended to accommodate at least in part the head 22 of the foot 2.

The notch 15 comprises walls 151, 152 which define angular abutment surfaces for the head 22 of the foot 2 in its rotational movement relative to the plate 1 about the axis A2. The housing 16 makes it possible to define a shoulder 161 or abutment surface 161 of the head 22 of the foot 2 along a vertical direction visible in FIG. 11, which is complementary to the surface 131. The surfaces 131 and 161 thus cooperate with the head of the foot for translationally securing the foot along the axis A2 relative to the plate 1.

The opening 13 furthermore comprises, as second positioning element, a bore 18 with axis A18, formed at the level of the surface 131, which serves as a guide means for the foot 2 on mounting thereof within this opening 13.

Figure 4:
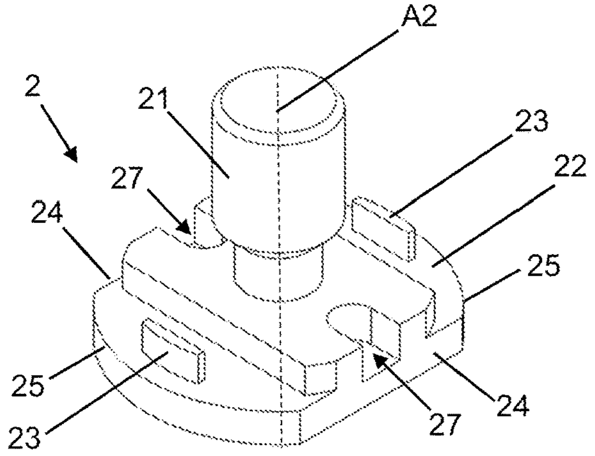
FIG. 4 is a first detail perspective view from below of a foot of the first variant of the first embodiment of the timepiece.
Figure 5:
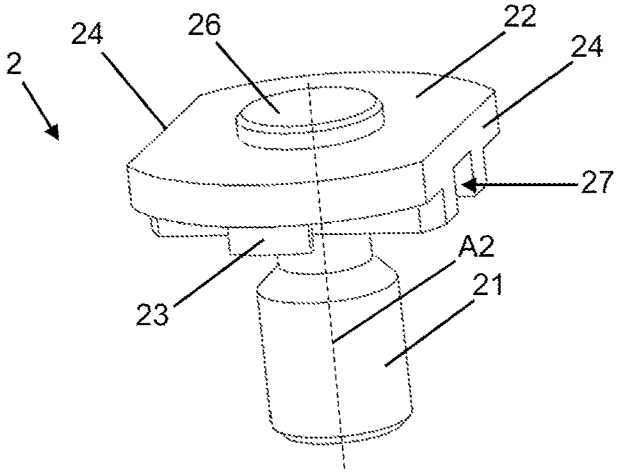
FIG. 5 is second detail perspective view from above of the foot of the first variant of the first embodiment of the timepiece.
Figure 6:
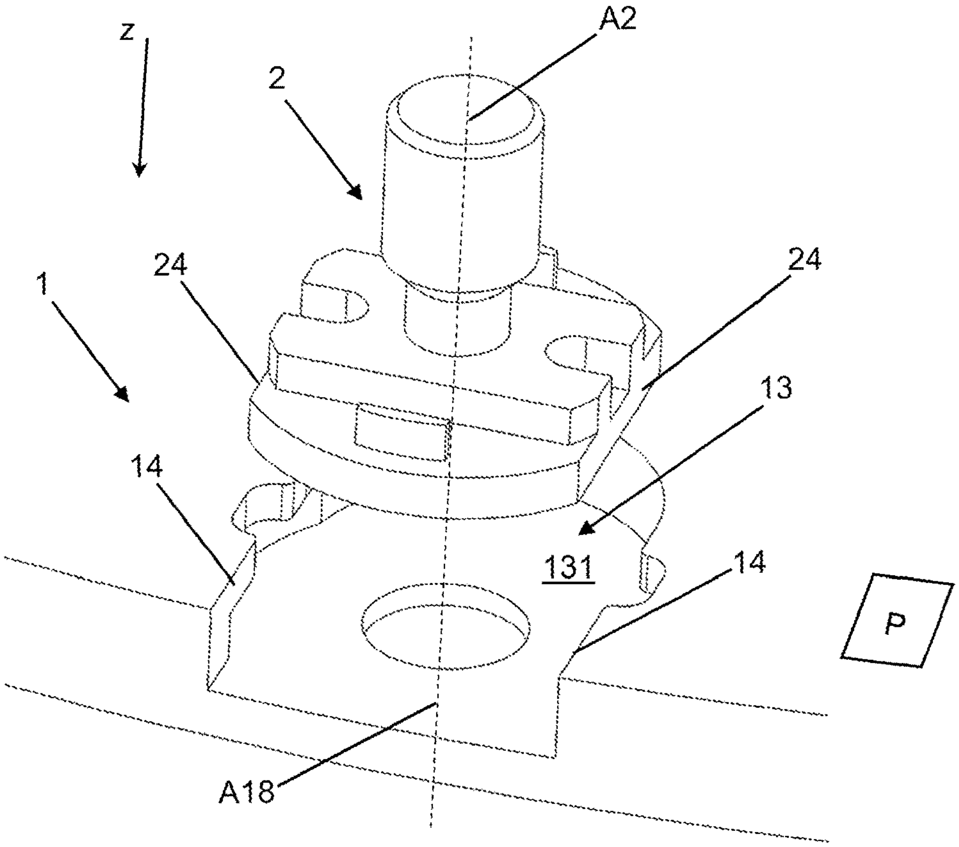
FIG. 6 is a first detail perspective view illustrating mounting a foot on a dial plate of the first variant of the first embodiment of the timepiece, during alignment positioning of the foot.
Figure 7:
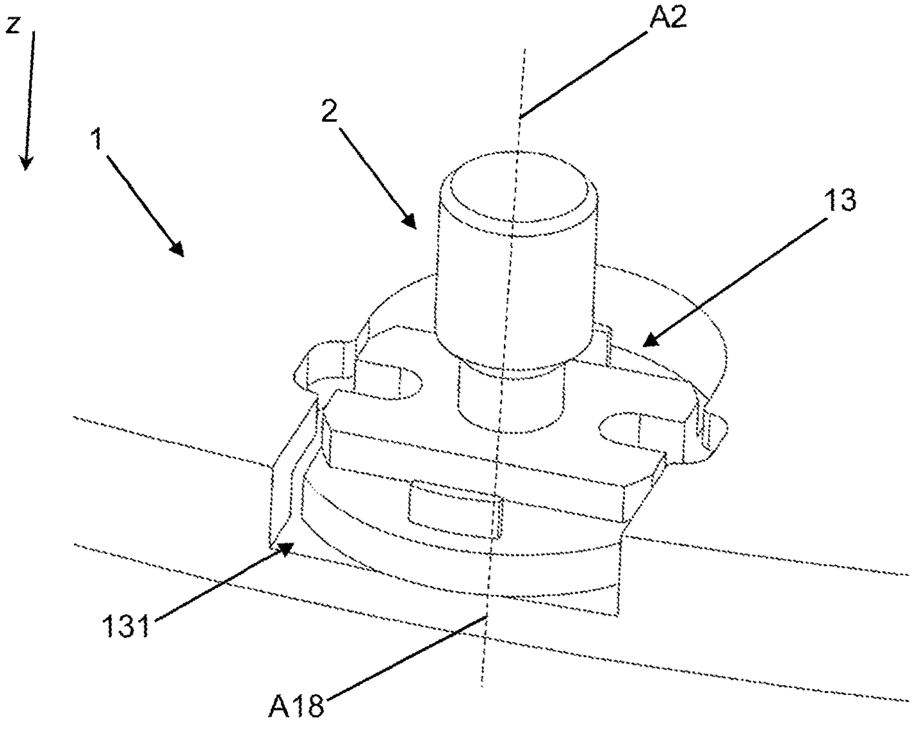
FIG. 7 is a second detail perspective view illustrating mounting a foot on a dial plate of the first variant of the first embodiment of the timepiece, during vertical positioning of the foot.
Figure 8:
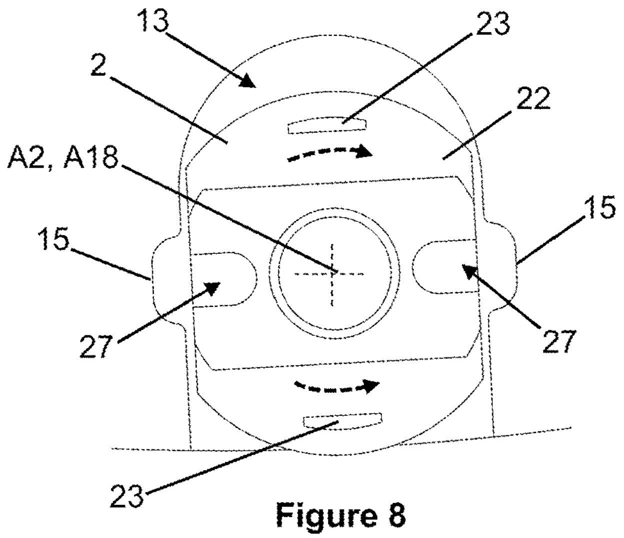
FIG. 8 is a third detail plan view illustrating mounting a foot on a dial plate of the first variant of the first embodiment of the timepiece, before rotation of the foot.

FIGS. 4 and 5 are detail views of the foot 2.

The foot 2 comprises a body 21, which extends longitudinally along the axis A2 from the head 22. Preferably, this body 21 takes the form of a cylinder which is provided to be accommodated in a bore 31 of the blank 3 of the horology movement 30.

In this first variant, the foot 2 comprises two plastically deformable shaped portions 23 which respectively take the form of lips 23 projecting from the head 22 along a direction parallel to the axis A2. Preferably, the lips and the body project from the head in the same direction.

The head 22 comprises a non-circular section. In particular, it comprises two flats 24 intended, in a step of assembling the foot on the plate, to be oriented along a direction parallel or substantially parallel to that of the walls 14 of the opening 13. It also comprises two cylindrical portions 25, disposed on either side of the flats 24, intended to be accommodated within housings 16 in another step of assembling the foot on the plate.

The foot 2 furthermore comprises, as first positioning element 26, a cylindrical portion 26 which extends longitudinally along the axis A2 from the head 22, in a direction opposed to that along which the body 21 extends. This portion 26 serves as a guide means for the foot 2 on mounting in the opening 13, and is more particularly provided to be inserted in the bore 18.

Finally, the foot 2 comprises, as element for driving the foot relative to the plate, a foot print 27 intended for permit displacement of said foot in the horizontal plane, once the head 22 is resting against the surface 131 of the opening 13. This foot print is for example made in the form of notches 27 shaped to cooperate with a suitable tool.

Figure 9:
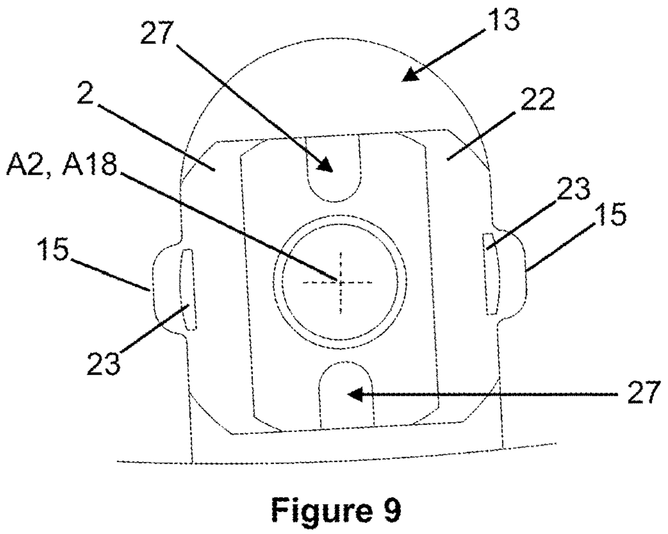
FIG. 9 is a fourth detail plan view illustrating mounting a foot on a dial plate of the first variant of the first embodiment of the timepiece, after rotation of the foot.
Figure 10:
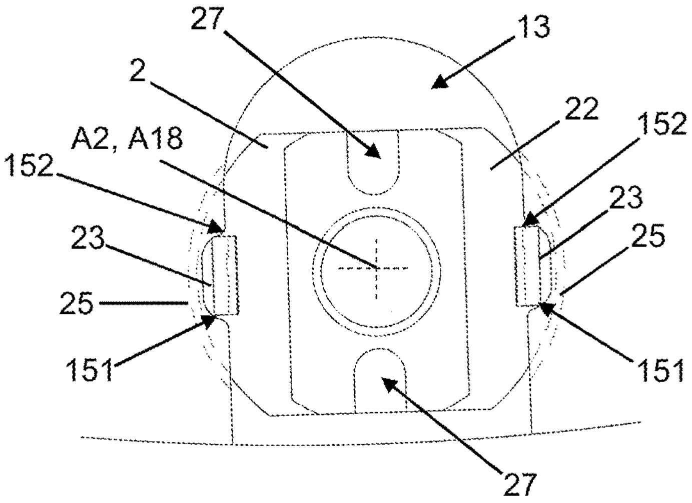
FIG. 10 is a fifth detail plan view illustrating mounting a foot on a dial plate of the first variant of the first embodiment of the timepiece, after locking deformation.

FIGS. 6 to 11 illustrate different steps in the method for assembling the foot 2 on the plate, in particular for assembling the foot 2 within the receiving opening 13. This assembly method can be considered to be a method for mounting a dial. The method comprises the following steps, in particular the following steps carried out chronologically:

- a first step E1 (illustrated in FIG. 6) consists in bringing the respective axes A2 and A18 of the foot 2 and the bore 18 into alignment while orienting the flats 24 along a direction parallel or substantially parallel to that of the walls 14 of the opening 13.
- a second step E2 (illustrated in FIG. 7) consists in bringing the foot 2 vertically closer to the opening 13 in the direction z, until the head 22 comes into contact with the surface 131.
- once the head 22 is resting against the surface 131, a third step E3 (illustrated in FIG. 8) consists in rotating the foot 2 about the axis A18 through an angle of 90°, in particular by way of the foot prints 27, for example with the assistance of a tool, until the lips 23 are positioned facing the notches 15 as shown in FIG. 9. In this configuration, the head 22, in particular the two cylindrical portions 25 of the head 22, is partially accommodated within the housings 16, such that vertical displacement of the head is limited to reduced play by the surfaces 131 and 161 more particularly visible in FIG. 11 (nevertheless illustrating the state after the fourth step, the lips 23 being in the deformed configuration).

a fourth step E4 consists in plastically deforming one or more lips 23 within the notches 15, in particular along at least one radial direction relative to the axis A2. Once deformed (as illustrated in FIG. 10), the lips 23 lock any relative movement of the foot 2 in relation to the plate 1 in the horizontal plane P, in particular any rotational movement about the axis A18 in the horizontal plane P. In particular, the walls 151, 152 of each notch 15 define angular abutment surfaces for the lips 23, and hence for the head 22 of the foot 2.

Figure 11:
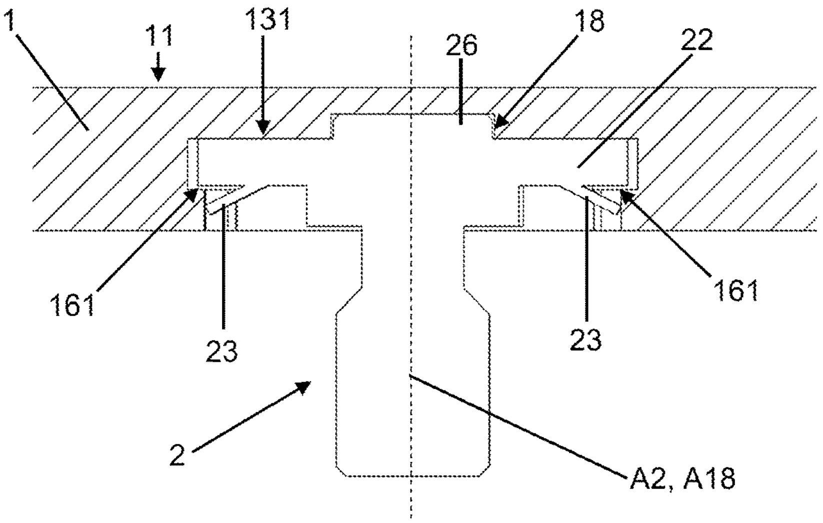
FIG. 11 is a sixth detail elevation cross-sectional view illustrating mounting a foot on a dial plate of the first variant of the first embodiment of the timepiece, after locking deformation.

Depending on the conformation of the lips and their deformation, this fourth step furthermore makes it possible to generate a frictional force of the lips against the notches 15, so making it possible to hold the head 22 against the surface 131 (as shown in FIG. 11).

Figure 12:
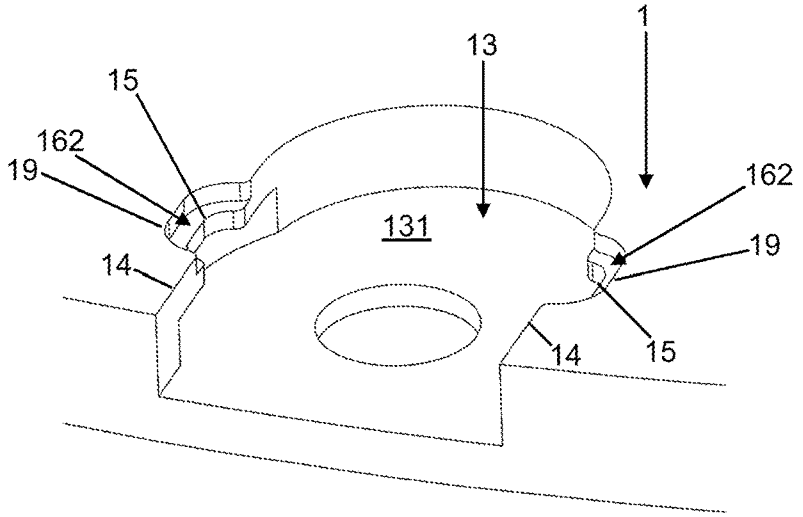
FIG. 12 is a detail perspective view of a dial plate of a second variant of the first embodiment of the timepiece.
Figure 13:
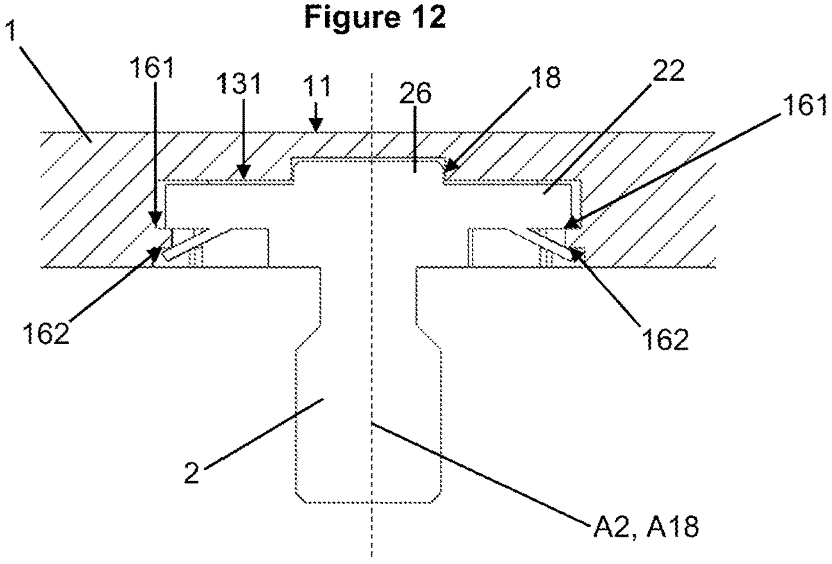
FIG. 13 is an elevation cross-section view of a foot mounted on a dial plate of the second variant of the first embodiment of the timepiece.

A second variant of the first embodiment is described hereafter with reference to FIGS. 12 to 13.

FIG. 12 shows a particular variant of the opening 13, which has the peculiarity of comprising notches 19 superposed on the notches 15, which form second shoulders 162 parallel to the first shoulders 161 and intended to come into contact with each of the lips 23, once the latter have been plastically deformed as shown in FIG. 13. Such a conformation of the opening 13 in particular makes it possible for the head 22 to be pressed against the shoulders 161, once the lips have been plastically deformed.

Thus, in the two first variants, the lips or tabs 23 are provided to lock with reduced, or even zero, play, any relative movement of the foot in relation to the dial plate along the horizontal plane P. They also make it possible to lock with reduced, or even zero, play any relative movement of the foot in relation to the dial plate along a vertical direction. Thus, in the two first variants, the lips or tabs 23 are provided to connect the foot 2 to the dial plate 1, or even to fix the foot 2 to the dial plate 1.

A third variant of the first embodiment is described hereafter with reference to FIGS. 14 to 18.

This third variant is essentially distinguished from the first and second variants with regard to geometric aspects.

Figure 14:
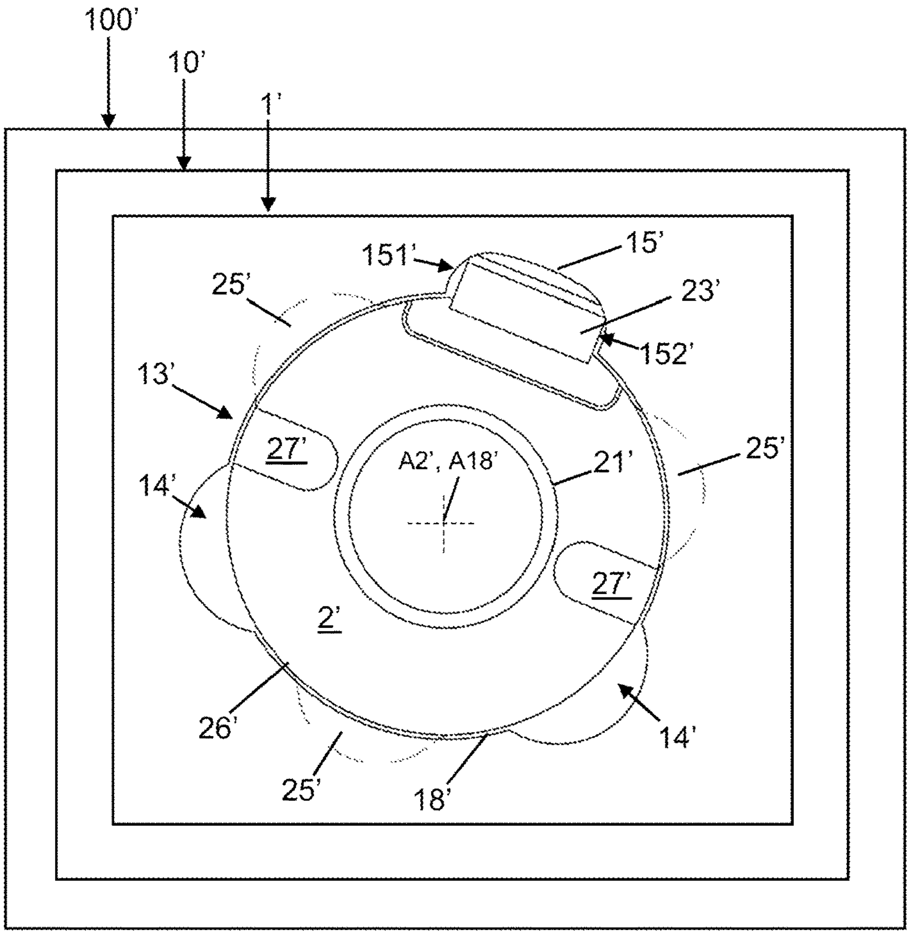
FIG. 14 is a first detail plan view illustrating mounting a foot on a dial plate of a third variant of the first embodiment of the timepiece, before rotation of the foot.

FIG. 14 shows a schematic view of the dial 10' comprising the dial plate 1' on which the foot 2' is mounted within the receiving opening 13'.

Figure 16:
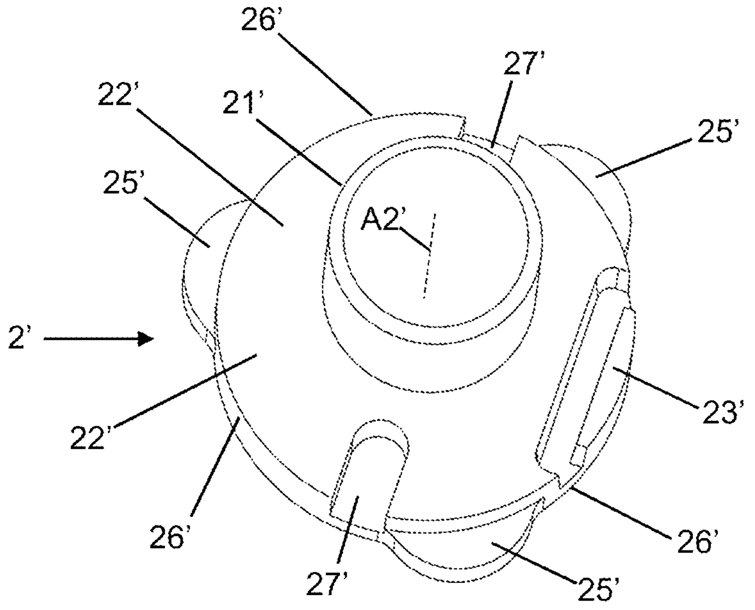
FIG. 16 is a detail perspective view of a foot of the third variant of the first embodiment of the timepiece.
Figure 17:
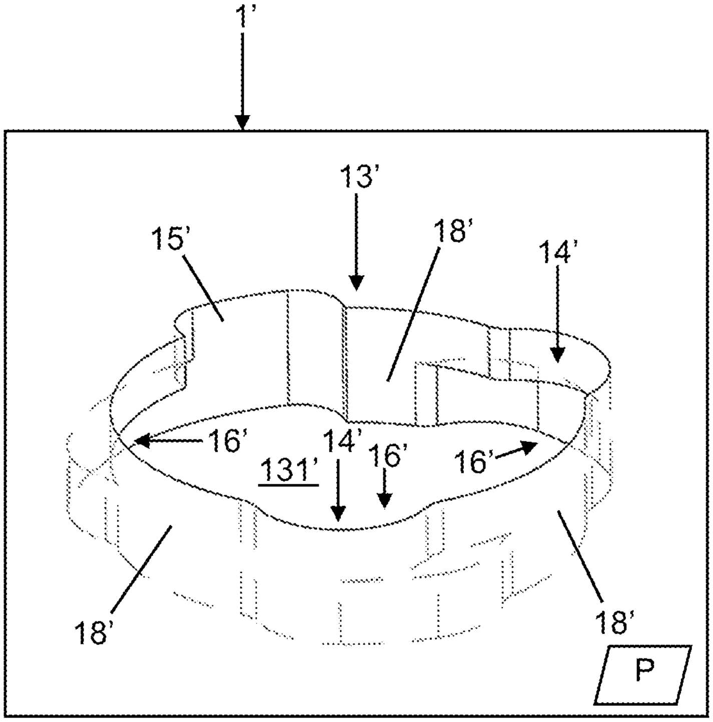
FIG. 17 is a detail perspective view of a dial plate of the third variant of the first embodiment of the timepiece.
Figure 18:
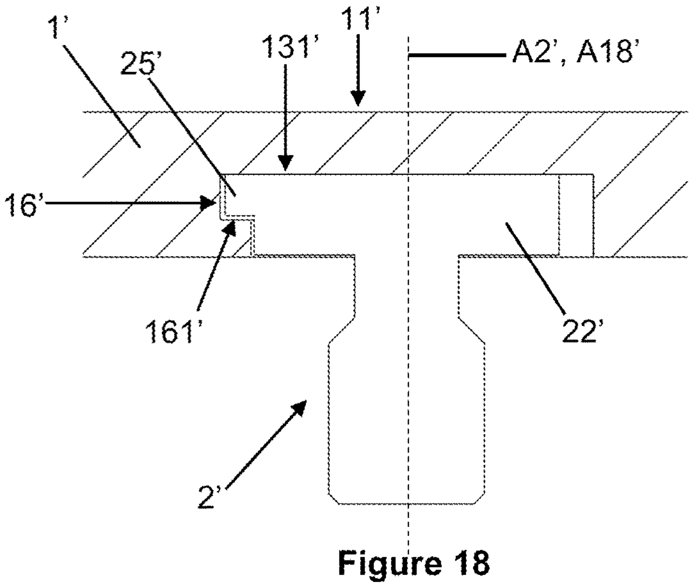
FIG. 18 is an elevation cross-sectional view of the foot on the dial plate of the third variant of the first embodiment of the timepiece.

The foot 2', more particularly visible in FIG. 16, is distinguished by the fact that it comprises a head 22' provided with three wings 25' (or lugs 25') provided each to be accommodated in three housings 16' of the opening 13', as shown in FIG. 17. The head 22' furthermore comprises three (coaxial or substantially coaxial) cylindrical portions 26' provided to cooperate respectively with three (coaxial or substantially coaxial) cylindrical portions 18' with axis A18' which form part of the contour of the opening 13', so as to enable positioning and guidance of the foot 2' within this same opening 13'. The number of wings 25' and/or cylindrical portions 18' could, of course, differ without consequently changing the principle of assembly of the foot 2' within the opening 13'.

The foot 2' also comprises at least one lip 23' projecting from the head 22' along a direction parallel to the axis A2' and in the same direction as that along which the cylindrical body 21' of the foot extends from the head 22'. Once the foot 2' is assembled, the lip 23' is plastically deformed within a notch 15' formed on the contour of the opening 13'.

The foot 2' furthermore comprises notches 27', similar to the notches 27 of the first variant, provided to allow said foot to be driven in rotation.

Such a foot 2' may be assembled within the opening 13' in four steps E1, E2, E3, E4 similar to those described previously.

Figure 15:
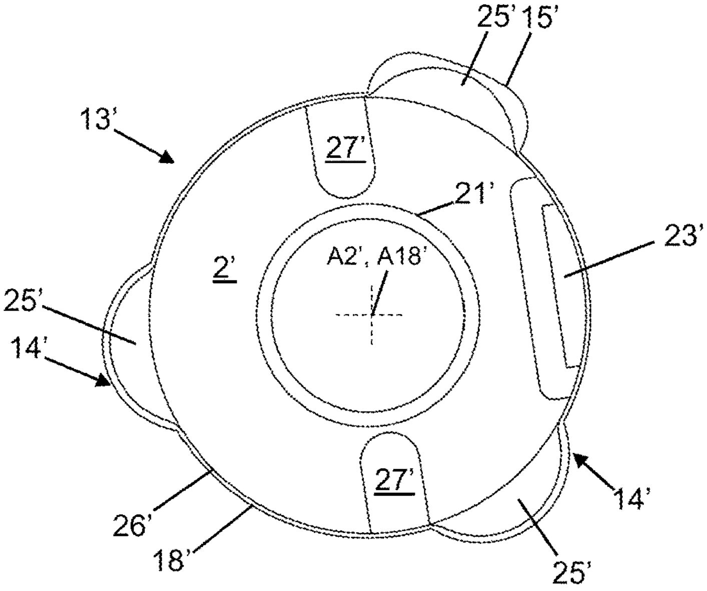
FIG. 15 is a second detail plan view illustrating mounting a foot on a dial plate of the third variant of the first embodiment of the timepiece, after rotation of the foot.

FIG. 15 illustrates the foot 2' within the opening 13' once the first and second steps E1, E2 have been carried out. Two wings 25' are here accommodated in cut-outs 14' of the opening 13', the shape of which substantially corresponds to that of the wings, while a third wing 25' is accommodated in the notch 15'. The extent of this notch is thus adapted so as to accommodate therein a wing on assembly of the foot.

A third step E3 consists in driving the foot 2' in rotation about the axis A18' over an angle of 60° for example, in particular by way of the shaped portions 27', until the lip 23' is positioned facing the notch 15'. In this configuration, the wings 25' are positioned in housings 16' more particularly visible in FIG. 17, such that said wings are held vertically between a surface 131' and the shoulders 161' formed by the housings 16' shown in FIGS. 17 and 18.

A fourth step E4 consists in plastically deforming the lip 23', along at least one radial direction relative to the axis A2', against the notch 15', as shown in FIG. 14. Once the lip has been deformed, the walls 151', 152' of each notch 15' define angular abutment surfaces for the lip 23', and hence for the head 22' of the foot 2'.

Depending on the conformation of the lip and its deformation, this fourth step furthermore makes it possible to generate a frictional force against the notch 15', so making it possible to hold the head 22' against the surface 131'.

A fourth variant of the first embodiment is described hereafter with reference to FIGS. 19 to 24.

This fourth variant is distinguished from the first three by the fact that the foot 2" comprises zones 23" of lower mechanical strength capable of being plastically deformed along a direction parallel or substantially parallel to the axis A2" of the foot 2".

Figure 19:
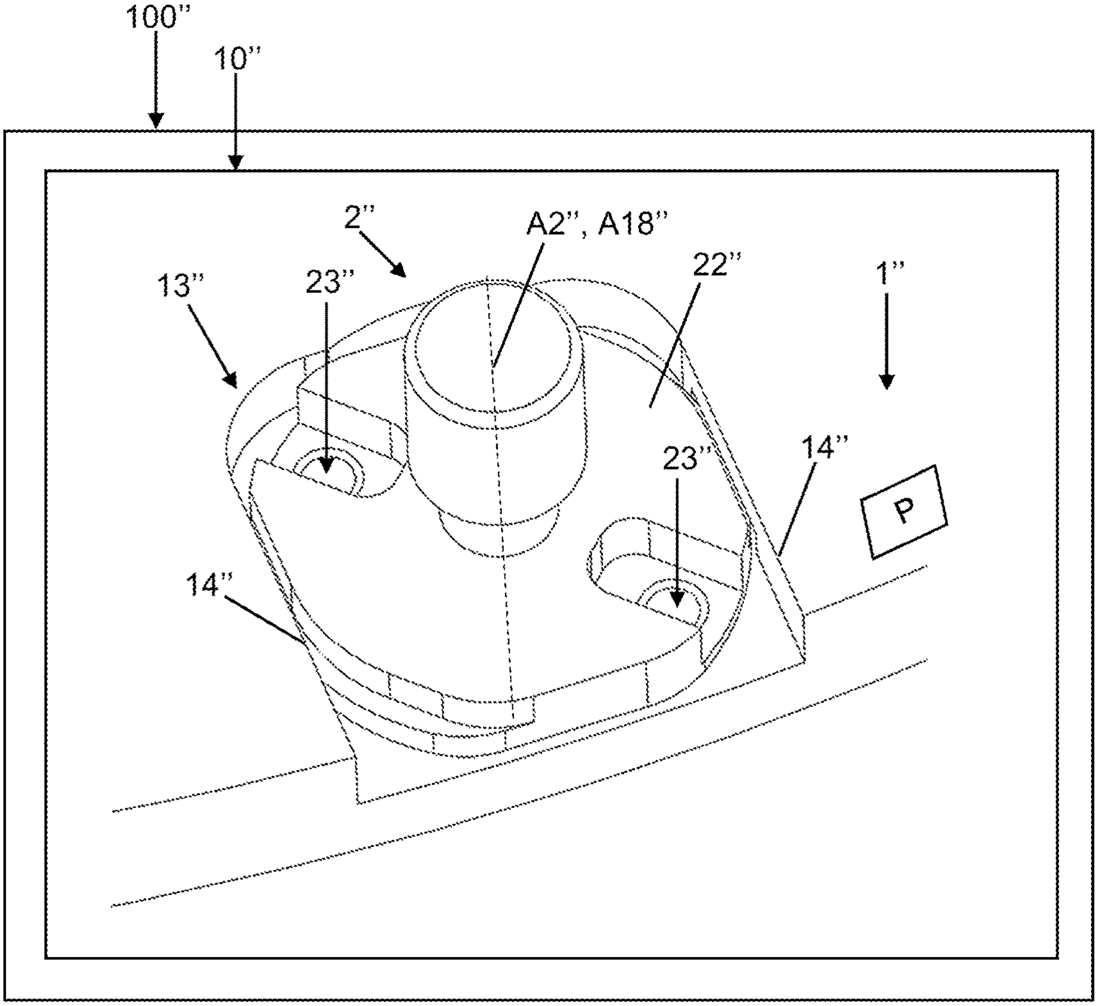
FIG. 19 is a detail perspective view illustrating mounting a foot on a dial plate of a fourth variant of the first embodiment of the timepiece.
Figure 20:
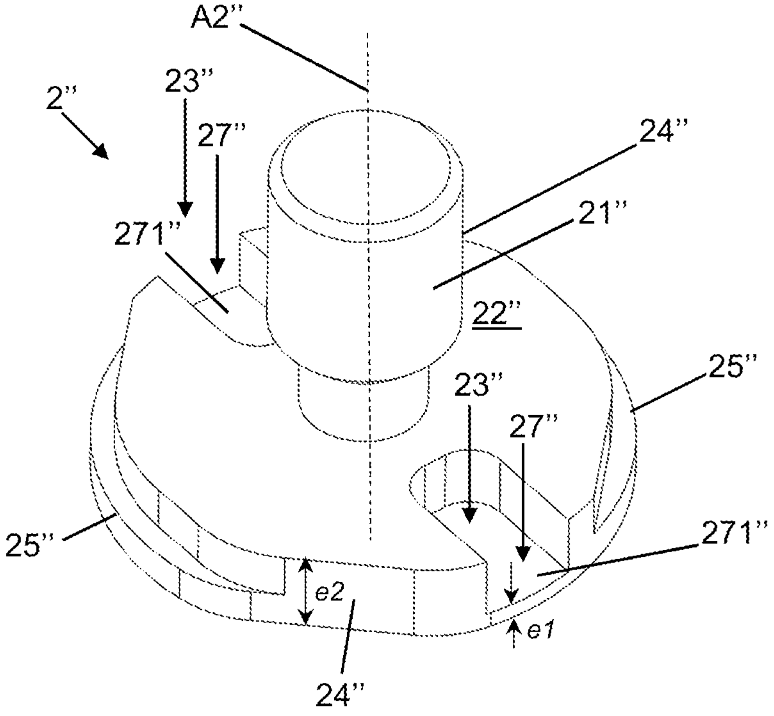
FIG. 20 is a detail perspective view of a foot of the fourth variant of the first embodiment of the timepiece.

FIG. 19 shows a schematic view of the dial 10" comprising the plate 1" on which the foot 2' is mounted within a receiving opening 13".

Figure 21:
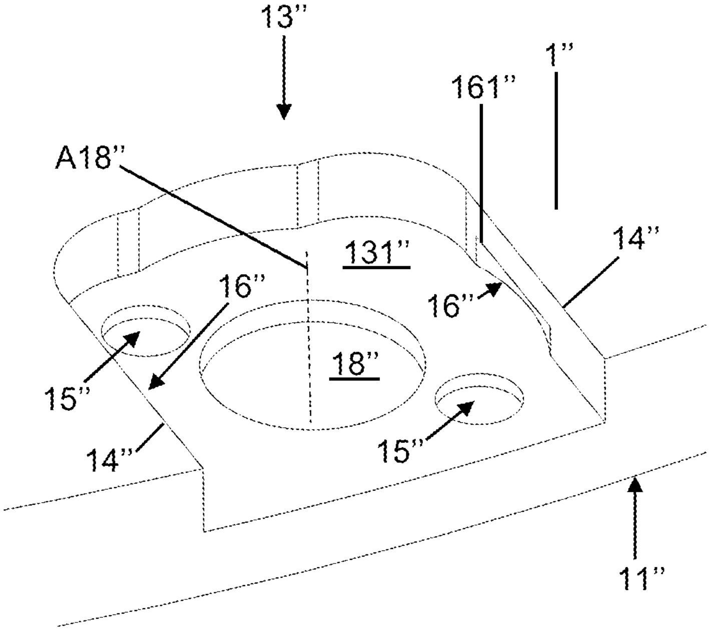
FIG. 21 is a detail perspective view of a dial plate of the fourth variant of the first embodiment of the timepiece.

Like the foot 2 of the first and second variants, the foot 2" (also visible in FIG. 20) comprises a head 22" provided with two flats 24" intended, in a first step of assembling the foot on the plate 1", to be oriented along a direction parallel or substantially parallel to that of the walls 14" of the opening 13" which assumes the form of a groove as visible in FIGS. 19 and 21. The foot 2" also comprises two cylindrical portions 25", disposed on either side of the flats 24", which are intended to be accommodated, in a third assembly step, within housings 16" of the opening 13".

Figure 24:
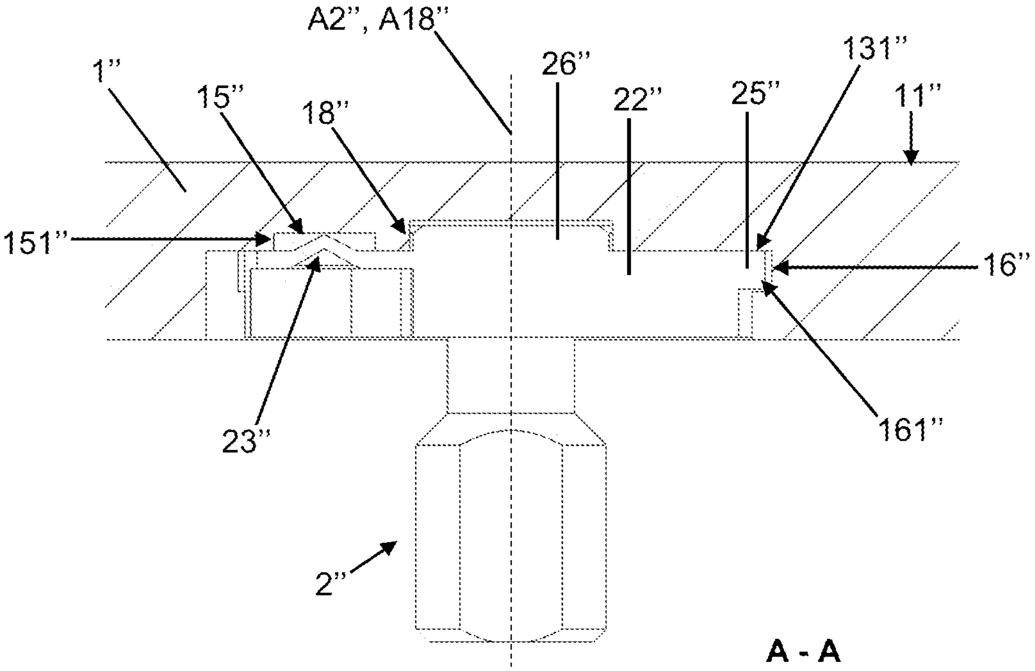
FIG. 24 is a third detail elevation cross-sectional view illustrating mounting a foot on a dial plate of the fourth variant of the first embodiment of the timepiece, after rotation of the foot.

The foot 2" furthermore comprises a cylindrical portion 26", visible in FIG. 24, which extends longitudinally along the axis A2" from the head 22", and in an opposite direction to that along which the body 21" of the foot extends from the head. This portion 26" has the same function as the portion 26 of the foot 2 of the first and second variants. It is here provided to cooperate with the bore 18" formed on the surface 131" of the opening 13", so as to permit centering and guidance of the foot 2" in the opening 13".

The foot 2" also comprises a foot print comprising two notches 27" formed on the head 22" and which have the same function as the notches 27 and 27' known from the previous variants.

These notches define two surfaces 271" which extend perpendicularly or substantially perpendicularly to the axis A2". The thickness e1 of the head 22" at the level of the surfaces 271" is substantially less than that of the maximum thickness e2 of the head 22", thicknesses e1 and e2 being measured along a direction parallel to the axis A2". For example, e1 is less than e2/3, or even less than e2/4. For example, e1 is less than 0.15 mm or less than 0.1 mm.

The surfaces 271" thus form two zones 23" of lower mechanical strength of the head 22". These zones are capable of being plastically deformed within notches or holes 15" which have the peculiarity of being formed on the surface 131" of the opening 13" as shown in FIG. 21. These holes are for example cylindrical blind holes.

Such a foot 2" may be assembled within the opening 13" in four steps E1, E2, E3, E4 similar to those described previously.

Figure 22:
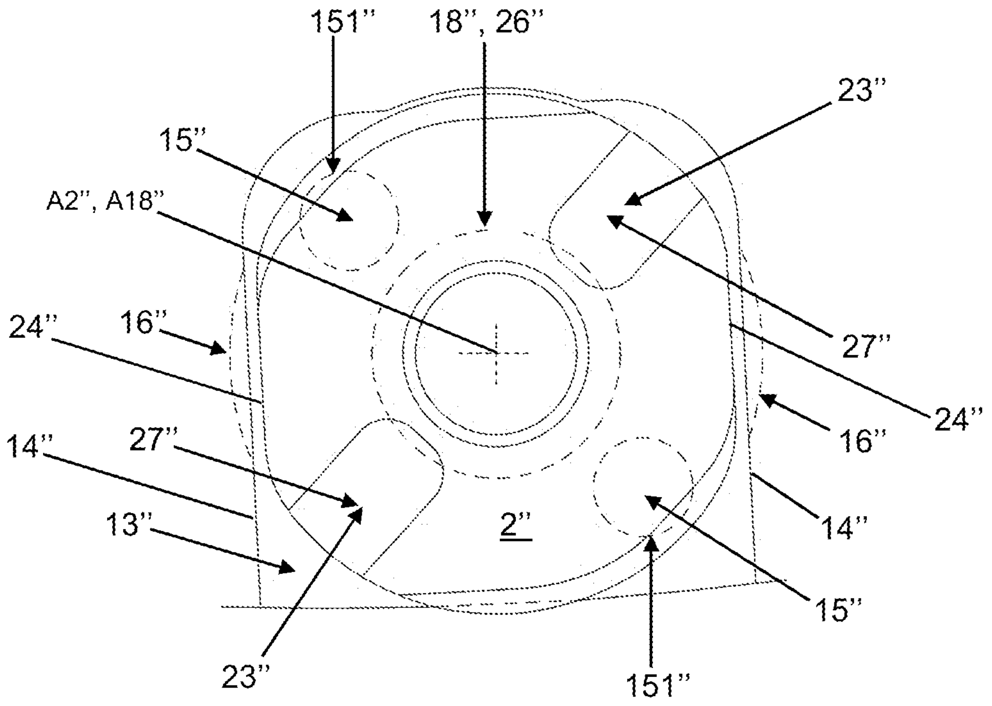
FIG. 22 is a first detail plan view illustrating mounting a foot on a dial plate of the fourth variant of the first embodiment of the timepiece, before rotation of the foot.

FIG. 22 illustrates the foot 2" within the opening 13" once the first and second steps E1, E2 have been carried out. The flats 24" are here oriented parallel to the walls 14" of the opening 13", while the portion 26" is accommodated in the bore 18".

A third step E3 consists in driving the foot 2" in rotation about the axis A18" over an angle of 90° for example, in particular by way of the shaped portions 27", until the zones 23" are positioned above the notches 15". In this configuration, the cylindrical portions 25" of the head 22" are positioned in housings 16" of the opening 13", more particularly visible in FIG. 21, such that said portions are held vertically between the surface 131" and the shoulders 161" formed by the housings 16".

Figure 23:
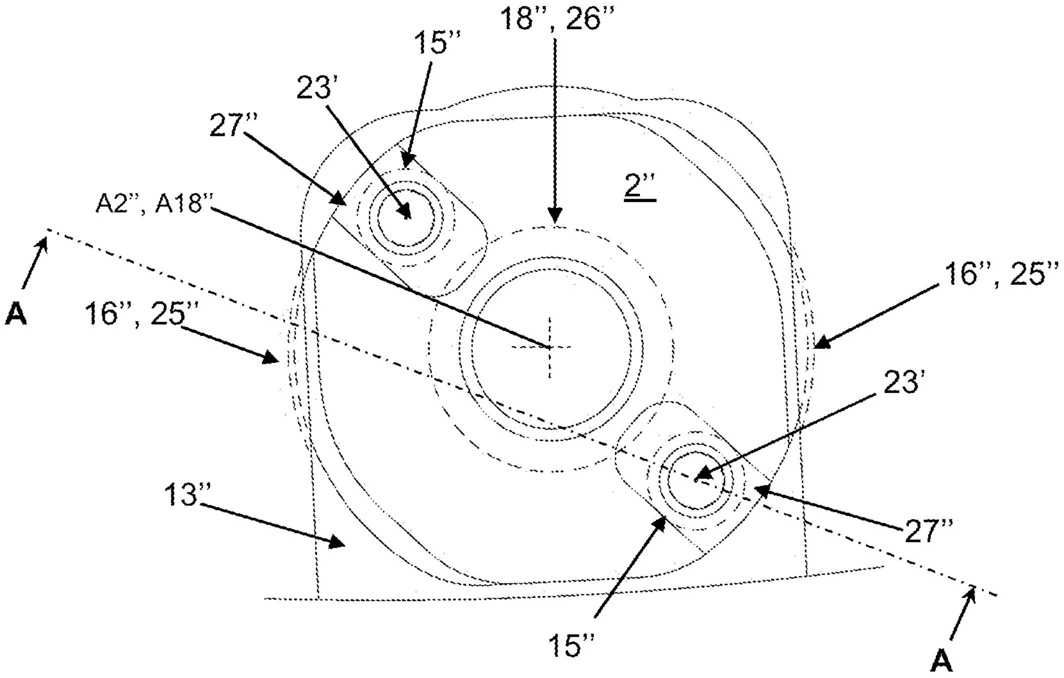
FIG. 23 is a second detail plan view illustrating mounting a foot on a dial plate of the fourth variant of the first embodiment of the timepiece, after rotation of the foot.

A fourth step E4 consists in plastically deforming the zones 23", along a direction parallel or substantially parallel to the axis A2", within the notches 15", as visible in FIGS. 23 and 24. Once these zones have been deformed, the contours 151" of the notches 15" define angular abutment surfaces of the head 22" of the foot 2". Depending on the conformation of their deformation, the zones 23" may furthermore generate friction forces within the notches 15", which makes it possible to hold the head 22" against the surface 131" or the surface 161".

In the variant illustrated, the zones 23" are fitted within the notches 27". It is nevertheless possible to create zones 23" outside the notches 27".

According to the first embodiment, whatever the variant, the following steps are taken to assemble the dial 10; 10; 10".

- A foot 2; 2'; 2", in particular a foot as previously described, is provided.
- A plate 1; 1'; 1", in particular a plate as previously described, is provided.
- The foot 2; 2'; 2" is positioned relative to the plate 1; 1'; 1", in particular in the plane P.
- The plastically deformable element 23; 23'; 23" is plastically deformed so as to connect the foot 2; 2'; 2" to the plate 1; 1'; 1" by cooperation of the plastically deformable element 23; 23'; 23" in the deformed configuration with a shaped portion 15; 15'; 15" of the dial plate 1; 1'; 1", in particular so as to rotationally lock the foot 2; 2'; 2" relative to the dial plate 1; 1'; 1" about the axis A2; A2'; A2".

A second embodiment of a timepiece 100* is described hereafter with reference to FIGS. 25 to 32.

Figure 25:
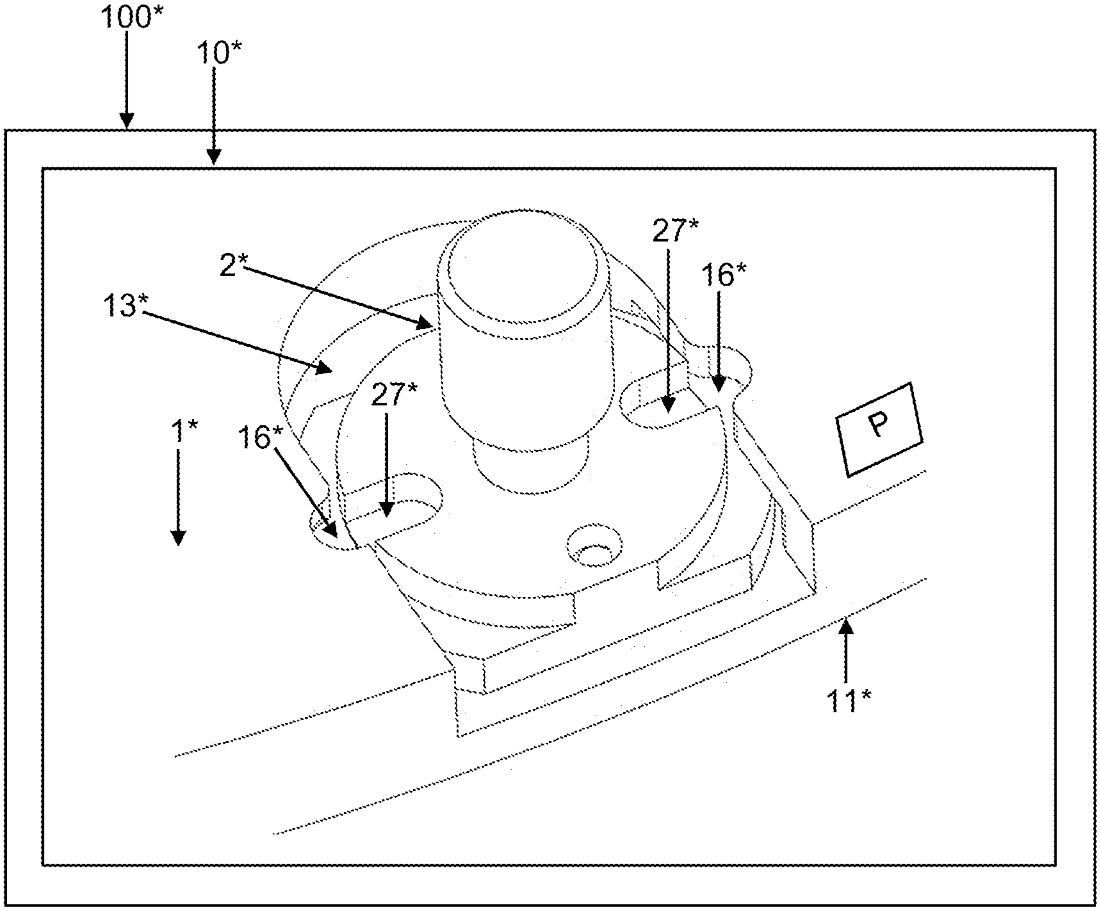
FIG. 25 is a schematic perspective view of a second embodiment of a timepiece.

FIGS. 25 to 31 illustrate a first variant of the second embodiment. FIG. 25 more particularly shows a schematic view of a dial 10* comprising the plate 1* on which the foot 2* is mounted within a receiving opening 13*.

In this second embodiment, the foot 2* comprises a friction means, in particular a friction spring 23*, which is capable of deforming elastically so as advantageously to press the foot against the dial plate.

Figure 26:
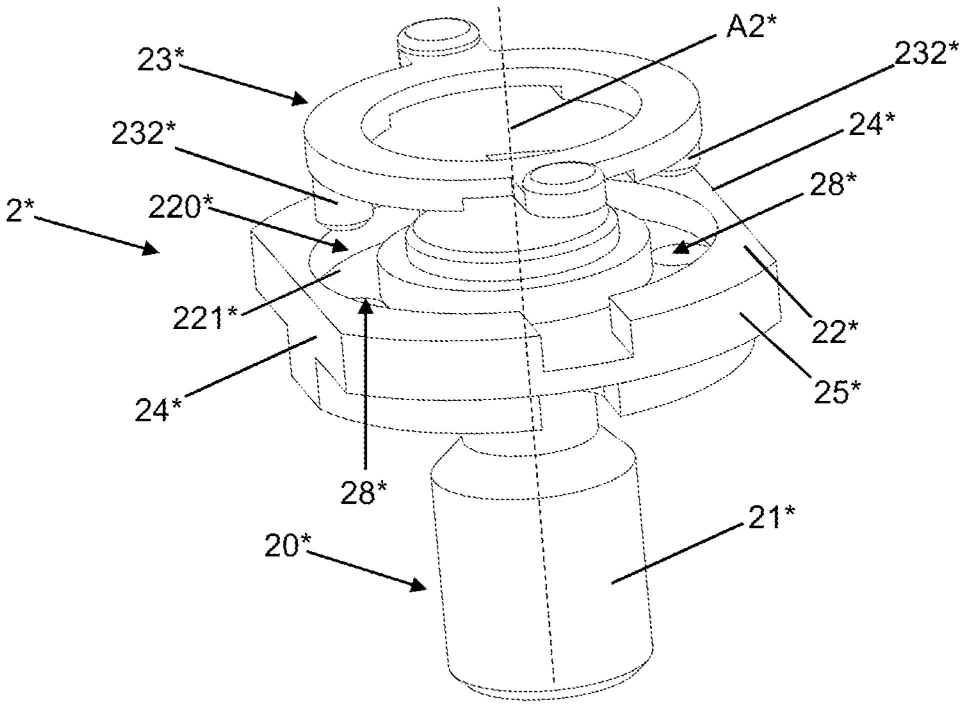
FIG. 26 is a first detail perspective view of a foot of the second embodiment of the timepiece, showing a foot element and a spring before positioning of the spring on the foot.
Figure 27:
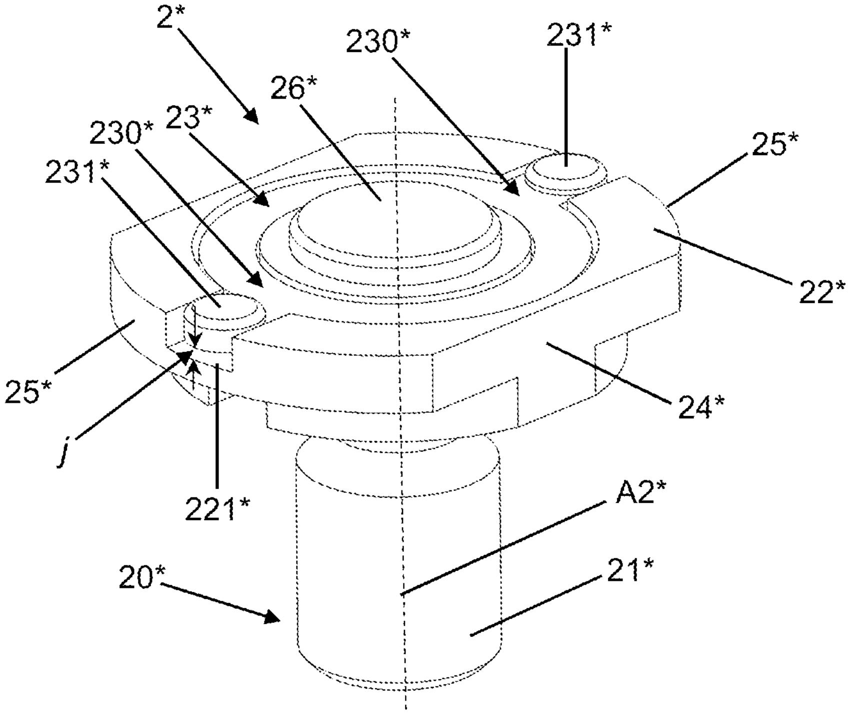
FIG. 27 is a second detail perspective view of the foot of the second embodiment of the timepiece, showing the foot element and the spring after positioning of the spring on the foot.

As shown in FIGS. 26 and 27, the foot 2* takes the form of an assembly made up of a one-piece foot element 20* and a friction spring 23* having a substantially annular geometry, which is provided with two elastic arms 230* on which projections 231* are formed. These projections permit assembly of said foot 2* within the opening 13*.

The spring 23* is more particularly shaped to be accommodated within a housing 220* formed in the head 22* of the one-piece foot element 20*. The spring 23* furthermore comprises two pegs 232* provided to be respectively driven into bores 28* disposed on the head 22*, so as to permit said spring 23* to be fixed within the housing 220*. Alternatively, the pegs 232* could be adhesively bonded, brazed, or indeed welded within the bores 28*. Once the spring 23* is accommodated within the head 22*, the latter may in particular rest against a receiving surface 221* defined by the housing 220*. Nevertheless, as shown in FIG. 27, play j remains between the surface 221* and the arms 230*, such that the latter can deform elastically on assembly of the foot 2* within the opening 13*. Furthermore, once the spring 23* is fixed within the head 22*, the projections 231* protrude slightly from the head 22*, such that they can be actuated on assembly of the foot 2* within the opening 13*, and so bring about elastic deformation of the arms 230*.

Figure 28:
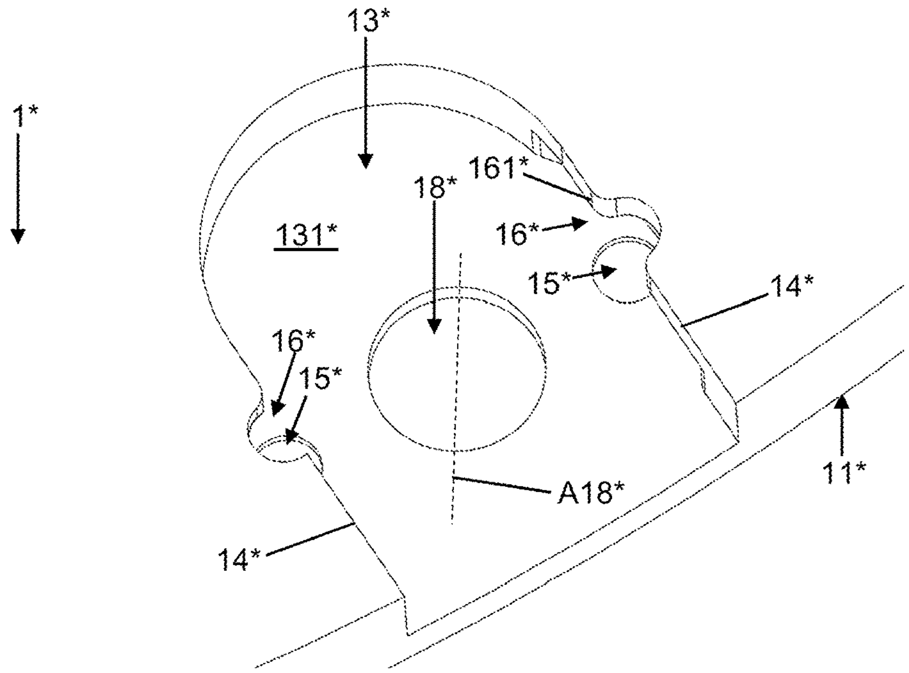
FIG. 28 is a detail perspective view of a dial plate of the second embodiment of the timepiece.

The principle of assembling the foot 2* within the opening 13* is very similar to that described in the context of the fourth variant of the first embodiment. The geometry of the receiving opening 13* is thus close to that known from the fourth variant. The opening 13* also takes the form of a groove, and in particular comprises notches or holes 15* (such as blind cylindrical holes) formed on the surface 131* of the opening 13*, in particular in the vicinity of the housings 16* as shown in FIG. 28. These notches 15* are shaped so as to accommodate the projections 231* of the spring, so as to prevent any displacement of the foot 2* in a horizontal plane, in particular any rotational movement. Furthermore, the opening 13* also comprises a bore 18* provided to receive a cylindrical portion 26* of the foot, the function of which has been described previously in the context of first embodiment.

Such a foot 2* may be assembled within the opening 13* in four steps E1*, E2*, E3*, E4*.

A first step E1* consists in bringing the respective axes A2* and A18* of the foot 2* and the bore 18* into alignment while orienting the flats 24* along a direction parallel or substantially parallel to that of the walls 14* of the opening 13*.

A second step E2* consists in bringing the foot 2* vertically closer to the opening 13* in the direction z, until the projections 231* of the spring 23* come into contact with the surface 131*.

Figure 29:
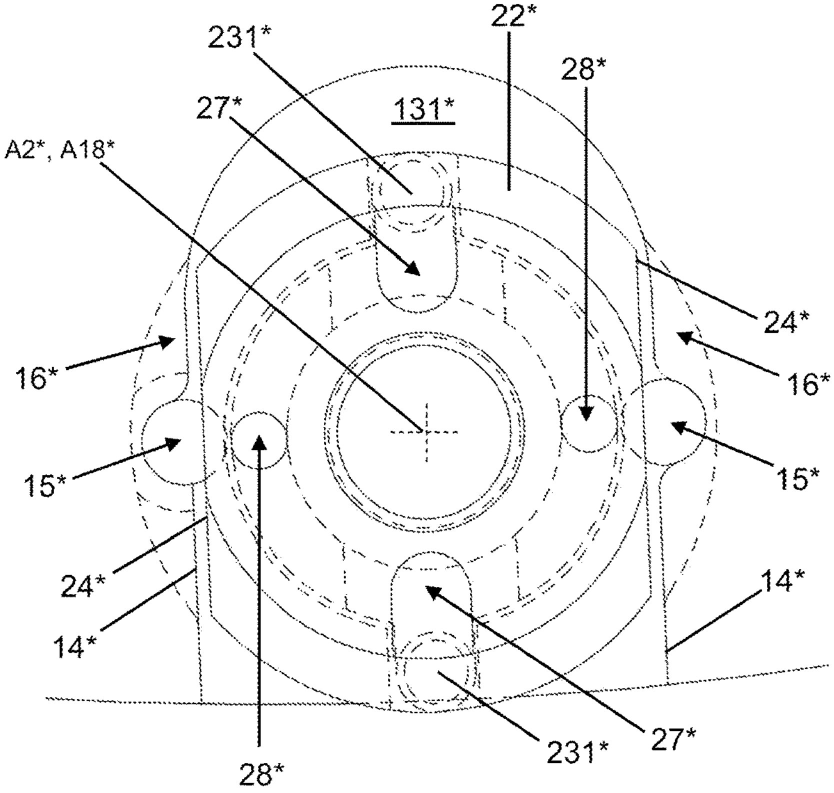
FIG. 29 is a first detail plan view illustrating mounting a foot on a dial plate of the second embodiment of the timepiece, before rotation of the foot.
Figure 30:
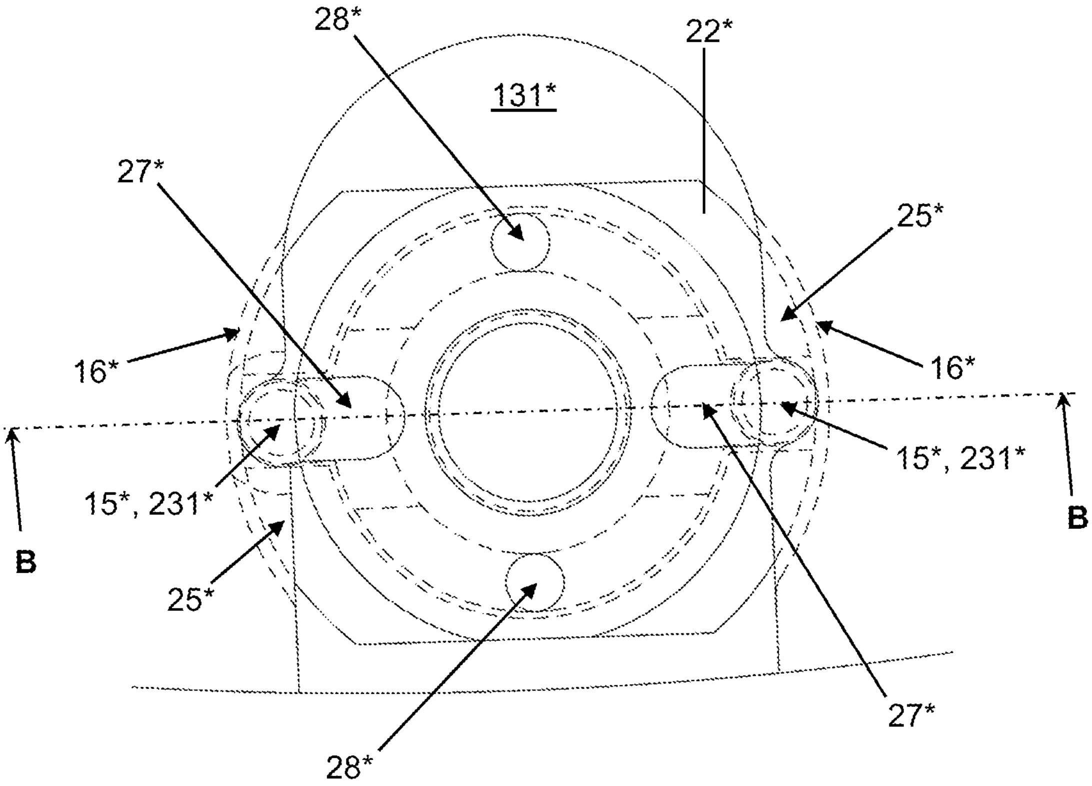
FIG. 30 is a second detail plan view illustrating mounting a foot on a dial plate of the second embodiment of the timepiece, after rotation of the foot.
Figure 31:
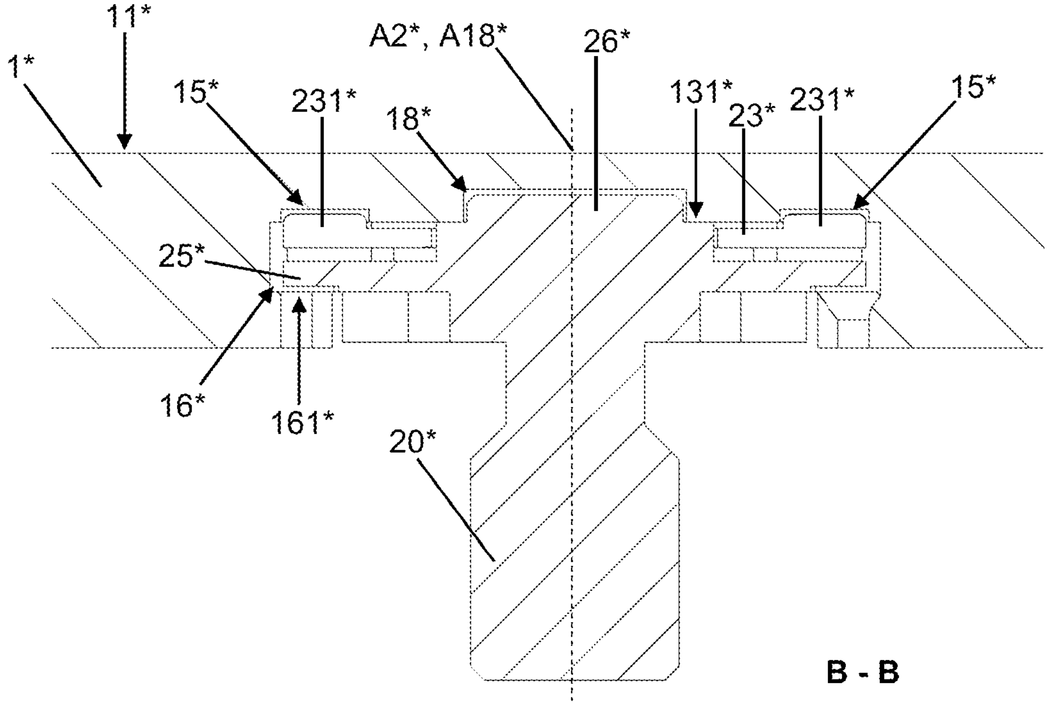
FIG. 31 is a third detail elevation cross-sectional view illustrating mounting a foot on a dial plate of the second embodiment of the timepiece, after rotation of the foot.

A third step E3* consists in continuing to bring the foot 2* vertically closer to the opening 13* in the direction z, so as to constrain the arms 230* until the head 22* comes to rest against the surface 131*. In this configuration, the projections 231* are at least partially retracted within the housing 220* so as to allow the following step E4* to be carried out. FIG. 29 is a plan view of the foot 2* and the plate 1* illustrating the configuration just before a fourth step E4*.

The fourth step E4* consists in driving the foot 2* in rotation about the axis A18* over an angle of 90° for example, in particular by way of the shaped portions 27* similar to those described previously, until the projections 231* are positioned above the notches 15*. In this configuration, the projections 231* are naturally accommodated within the notches 15* under the effect of elastic recovery of the arms 230*. The foot 2* is thus prevented from making any movement in the horizontal plane P, in particular any rotational movement within the opening 13*. Furthermore, in this same configuration, cylindrical portions 25* of the head 22* are positioned in the housings 16* of the opening 13*, such that they are held vertically between the surface 131* and the shoulders 161* formed by the housings 16*, as visible in FIGS. 30 and 31.

The spring 23* is thus provided to lock with reduced play any relative movement of the foot in relation to the dial plate along the horizontal plane. It also makes it possible to lock with reduced play any relative movement of the foot in relation to the dial plate along a vertical direction. The spring 23* is thus provided to connect the foot 2* to the dial plate 1*.

In the variant of spring 23* illustrated in FIGS. 25 to 31, the spring is no longer stressed once the projections 231* are disposed within the notches 15*. This is due to the geometry of the arms 230* in their resting configuration: it is such that axial play remains once the cylindrical portions 25* are accommodated within the housings 16*.

Figure 32:
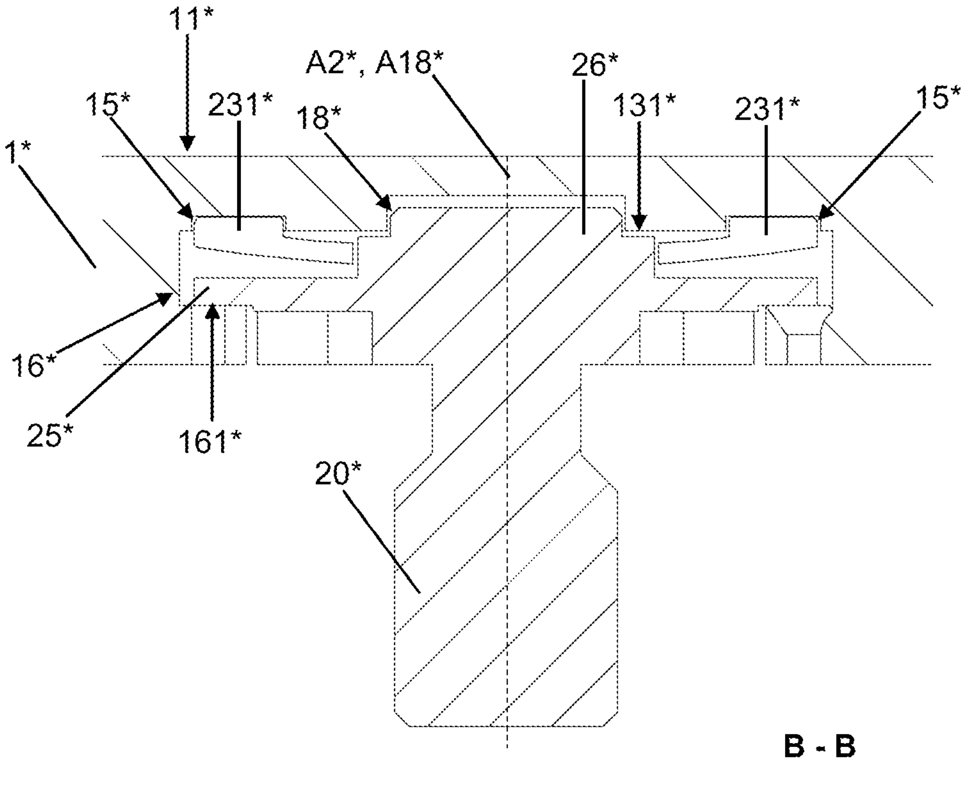
FIG. 32 is a detail view corresponding to the view of FIG. 31, except in a variant with a spring having a different geometry.

Alternatively, the spring 23* could for example have a different, in particular concave, geometry (as shown in FIG. 32), such a first level of stress prevails on retraction of the projections 231* within the housing 220*, and a second level of stress, lower than the first, once the projections 231* are disposed within the notches 15*. In particular, this allows the head 22* to be pressed against the shoulders 161* and so lock with zero play any relative movement of the foot in relation to the dial plate along a vertical direction. The spring 23* is thus provided to connect the foot 2* to the dial plate 1*, or even to fix the foot 2* to the dial plate 1*.

In all the embodiments and variants described above, assembly of the foot 2; 2'; 2"; 2* on the plate 1; 1'; 1"; 1* requires a rotational movement in a horizontal plane on the part of the foot. These are respectively assembly steps E3 and E4* described above. However, depending on the conformation of the elements 2; 2'; 2"; 2* and 13; 13'; 13"; 13*, the foot could for example undergo a translational movement during these steps to bring the foot into its position in the plane P relative to the plate. In such a case, the foot might not have a cylindrical guide portion 26; 26'; 26"; 26* and the plate might not have a cylindrical guide portion 18; 18'; 18"; 18*. Positioning of the foot relative to the plate could be defined by contact cooperation of the geometries of the non-opening end of the groove and the foot.

Whatever the embodiment and the variant, the deformable elements 23; 23'; 23"; 23* are advantageously provided to lock with reduced, or even zero, play, any relative movement of the foot in relation to the dial plate along the horizontal plane P. They also make it possible to lock with reduced, or even zero, play any relative movement of the foot in relation to the dial plate along a vertical direction z.

As seen previously, the various dial solutions described have the peculiarity of implementing a foot which comprises at least one means of (plastic or elastic) deformation enabling the assembly thereof within a constituent plate of the dial.

In the first embodiment, the foot comprises at least one shaped portion or a zone of lower mechanical strength capable of being plastically deformed within a receiving opening formed in the dial plate.

In the second embodiment, the foot comprises an elastic means, in particular a friction spring, which is capable of deforming elastically within a receiving opening formed in the dial plate.

The receiving openings for the feet have specific features common to each of the embodiments.

A second aspect of the invention is defined by the following propositions:

1. A foot (2; 2'; 2"; 2*) for a timepiece (100; 100'; 100"; 100*) dial (10; 10'; 10"; 10*) comprising a deformable element (23; 23'; 23"; 23*) arranged so as to connect the foot (2; 2'; 2"; 2*) to a dial plate (1; 1'; 1"; 1*) by cooperation, in particular by obstacle cooperation, of the deformable element (23; 23'; 23"; 23*) in the deformed configuration with a shaped portion (15; 15'; 15"; 15*) of a dial plate (1; 1'; 1"; 1*)
2. A dial plate (1; 1'; 1"; 1*) for a timepiece (100; 100'; 100"; 100*) dial (10; 10'; 10"; 10*) comprising a shaped portion (15; 15'; 15"; 15*), in particular a concave or recessed shaped portion, arranged so as to connect a foot (2; 2'; 2"; 2*) to the dial plate (1; 1'; 1"; 1*) by cooperation, in particular by obstacle cooperation, of the shaped portion (15; 15'; 15"; 15*) with a deformable element (23; 23'; 23"; 23*) of a foot (2; 2'; 2"; 2*).
3. A dial (10; 10'; 10"; 10*) for a timepiece (100; 100'; 100"; 100*) comprising at least one foot (2; 2'; 2"; 2*) according to proposition 1, preferably two feet (2; 2'; 2"; 2*) according to proposition 1, and/or a dial plate (1; 1'; 1"; 1*) according to proposition 2.
4. The dial according to proposition 3, wherein the deformable element (23; 23'; 23"; 23*) and the shaped portion (15; 15'; 15"; 15*) are arranged so as to index the foot positionally in relation to the dial plate (1; 1'; 1"; 1*) along a plane (P) parallel to said dial plate.
5. The dial according to proposition 4, wherein the deformable element (23; 23'; 23"; 23*) and the shaped portion (15; 15'; 15"; 15*) are arranged so as to define one or more indexing positions of the foot in relation to the plate, in particular one or more indexing positions of the foot relative to the plate about the axis (A2; A2'; A2"; A2*).
6. A timepiece (100; 100'; 100"; 100*) comprising a foot (2; 2'; 2"; 2*) according to proposition 1 and/or a dial plate (1; 1'; 1"; 1*) according to proposition 2 and/or a dial (10; 10'; 10"; 10*) according to one of propositions 3 to 5.
7. A method for mounting a dial (10; 10'; 10"; 10*) for a timepiece (100; 100'; 100"; 100*) or a timepiece (100; 100'; 100"; 100*) comprising the following steps:
   - providing a foot (2; 2'; 2"; 2*), in particular a foot according to proposition 1,
   - providing a dial plate (1; 1'; 1"; 1*), in particular a plate according to proposition 2,
   - positioning the foot (2; 2'; 2"; 2*) relative to the dial plate (1; 1'; 1"; 1*), in particular along a plane (P) parallel to the dial plate (1; 1'; 1"; 1*), in particular positioning the foot relative to the plate by translation of the foot along a vertical direction, then rotation of the foot about the axis (A2; A2'; A2"; A2*) relative to the plate, deforming a deformable element (23; 23'; 23"; 23*) so as to connect the foot (2; 2'; 2"; 2*) to the dial plate (1; 1'; 1"; 1*) by cooperation of the deformable element with a shaped portion (15; 15'; 15"; 15*) of the dial plate (1; 1'; 1"; 1*), in particular so as to lock the foot (2; 2'; 2"; 2*) rotationally relative to the dial plate (1; 1'; 1"; 1*) about an axis (A2; A2'; A2"; A2*) perpendicular to a plane (P) parallel to the dial plate (1; 1'; 1"; 1*).

8. The mounting method according to proposition 7, wherein the deformation of the deformable element is brought about by elastic recovery of the deformable element when the deformable element is located in a position of cooperation with the shaped portion (15*) or wherein the deformation of the deformable element is a plastic deformation brought about by an operator when the deformable element is located in a position of cooperation with the shaped portion (15; 15'; 15").

9. A dial (10; 10'; 10"; 10*) obtained by carrying out the method according to proposition 7 or 8.

Throughout this document, "indexing an element" or "positionally indexing an element", is taken to mean defining different stable positions of an element. These stable positions may be separated by a continuum of unstable intermediate positions. Between two stable positions, or two indexed positions, or two indexing positions, the element transitions through a continuum of unstable or less stable intermediate positions.

Unless technically or logically incompatible, subject matter of the second aspect may be combined with any of the features of the first aspect.

The solutions described above are particularly advantageous for assembling a foot on a dial made from a material having no or a limited range of plastic deformation, in particular on a dial made of a ceramic or natural stone or more generally of a brittle material.

The invention claimed is:

1. A foot for a timepiece dial comprising:

first and second ends along a main axis of the foot, and a head located at the first end of the foot, wherein the head comprises:

a deformable element so as to connect the foot to a dial plate by cooperation of the deformable element in a connecting configuration with a shaped portion of the dial plate, a first portion having a first radial dimension in a first direction, the first portion being adapted to penetrate into a first recess of the shaped portion of the dial plate before attaining the connecting configuration of the deformable element, and a second portion having a second radial dimension larger than the first radial dimension in a second direction different from the first direction, the second portion being adapted to penetrate into a second recess of the shaped portion of the dial plate by rotation of the head before attaining the connecting configuration of the deformable element, wherein the deformable element in the deformed configuration protrudes radially and/or axially from a contour of the deformable element before attaining the connecting configuration, so as to cooperate with the shaped portion of the dial plate to lock the foot rotationally about the main axis of the foot relative to the dial plate.

2. The foot as claimed in claim 1, wherein the deformable element is arranged so as to lock the foot in a plane parallel to a main plane of the dial plate.

3. The foot as claimed in claim 2, wherein the deformable element is arranged so as to lock the foot rotationally about an axis perpendicular to a main plane of the dial plate.

4. The foot as claimed in claim 1, wherein the head comprises at least one cylindrical portion.

5. The foot as claimed in claim 1, wherein the second portion of the head comprises flats or wings.

6. The foot as claimed in claim 1, wherein the foot comprises a first positioning element of the foot relative to the dial plate.

7. The foot as claimed in claim 6, wherein the first positioning element is arranged so as to position the foot relative to the dial plate in a plane parallel to a main plane of the dial plate.

8. The foot as claimed in claim 6, wherein the first positioning element comprises a cylindrical portion for positioning and/or rotational guidance of the foot about an axis perpendicular to a plane parallel to a dial plate.

9. The foot as claimed in claim 1, wherein the foot comprises an element for driving the foot relative to the dial plate.

10. The foot as claimed in claim 1, wherein the deformable element is a plastically deformable lip or wall.

11. A dial for a timepiece comprising a dial plate and at least one foot as claimed in claim 1.

12. A timepiece comprising the dial as claimed in claim 11.

13. A method of mounting a dial for a timepiece comprising:

providing the foot as claimed in claim 1, providing the dial plate having a shaped portion adapted to connect the foot to the dial plate, positioning the foot relative to the dial plate, deforming the deformable element so as to connect the foot to the dial plate by cooperation of the deformable element in a connecting configuration with the shaped portion of the dial plate.

14. A dial comprising a dial plate and the foot as claimed in claim 1, wherein the foot is connected to the dial plate by cooperation of the deformable element in the connecting configuration with a shaped portion of the dial plate.

15. The method as claimed in claim 13, wherein the foot is positioned along a plane parallel to a main plane of the dial plate, and the deformable element is deformed so as to lock the foot rotationally relative to the dial plate about an axis perpendicular to the main plane of the dial plate.

16. The foot as claimed in claim 1, wherein the foot is arranged so as to connect the foot to a dial plate by obstacle cooperation of the deformable element in the connecting configuration with a shaped portion of the dial plate.

17. The foot as claimed in claim 1, wherein the deformable element is plastically deformable.

18. The foot as claimed in claim 1, wherein the deformable element is elastically deformable.

19. The foot as claimed in claim 1, wherein the deformable element is placed on the head so as to be accessible from a side of the head oriented toward the second end of the foot.

20. A dial plate for a timepiece dial comprising:

a shaped portion arranged so as to connect a head of a foot to the dial plate by cooperation of the shaped portion with a deformable element of a foot, wherein the shaped portion comprises:

a first recess adapted to receive a first portion of the head having a first radial dimension in a first direction, before attaining a connecting configuration of the deformable element, and a second recess adapted to receive a second portion of the head having a second radial dimension larger than the first radial dimension in a second direction different from the first direction, by rotation of the head before attaining the connecting configuration of the deformable element.

21. The dial plate as claimed in claim 20, wherein:

the dial plate comprises a second positioning element of a foot relative to the dial plate, and/or the shaped portion is arranged so as to lock the foot in a plane parallel to a main plane of the dial plate.

22. The dial plate as claimed in claim 20, wherein the dial plate comprises a receiving opening intended to receive entirely the head of the foot.

23. The dial plate as claimed in claim 20, wherein the shaped portion is a notch.

24. A foot for a timepiece dial comprising:

first and second ends along a main axis of the foot, and a head located at the first end of the foot, wherein the head comprises:

a deformable element so as to connect the foot to a dial plate by cooperation of the deformable element in a connecting configuration with a shaped portion of the dial plate, a portion adapted to mechanically connect the foot to the shaped portion of the dial plate before attaining the connecting configuration of the deformable element, wherein the deformable element in the deformed configuration protrudes radially and/or axially from a contour of the deformable element before attaining the connecting configuration, so as to cooperate with the shaped portion of the dial plate to lock the foot rotationally about the main axis of the foot relative to the dial plate, wherein the deformable element is placed on the head so as to be accessible from a side of the head oriented toward the second end of the foot.

* * * * *